United States Patent
Nakai et al.

(12)

(10) Patent No.: US 6,247,034 B1
(45) Date of Patent: Jun. 12, 2001

(54) FAST FOURIER TRANSFORMING APPARATUS AND METHOD, VARIABLE BIT REVERSE CIRCUIT, INVERSE FAST FOURIER TRANSFORMING APPARATUS AND METHOD, AND OFDM RECEIVER AND TRANSMITTER

(75) Inventors: Yuji Nakai; Akihiro Furuta, both of Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/371,923

(22) Filed: Aug. 11, 1999

Related U.S. Application Data

(62) Division of application No. 09/010,499, filed on Jan. 21, 1998, now Pat. No. 6,115,728.

(30) Foreign Application Priority Data

Jan. 22, 1997 (JP) ..................................................... 9-009204
Aug. 7, 1997 (JP) ..................................................... 9-212861

(51) Int. Cl.[7] .................................................. G06F 17/14
(52) U.S. Cl. ........................................... 708/409; 708/404
(58) Field of Search .................................. 708/400–410, 708/209

(56) References Cited

U.S. PATENT DOCUMENTS

| H570 | * | 1/1989 | Tylaska et al. ..................... 708/403 |
| 3,871,577 | | 3/1975 | Avellar et al. . |

(List continued on next page.)

FOREIGN PATENT DOCUMENTS

| 54-082941 | 2/1979 | (JP) . |
| 01303565 | 7/1989 | (JP) . |
| 02237374 | 9/1990 | (JP) . |
| 02242471 | 9/1990 | (JP) . |
| 2-242471 | 9/1990 | (JP) . |
| 04031965 | 2/1992 | (JP) . |
| 06035951 | 10/1994 | (JP) . |
| 07234863 | 9/1995 | (JP) . |
| 09018443 | 1/1997 | (JP) . |

OTHER PUBLICATIONS

E. Bidet, et al., "A Fast Single Chip Implementation of 8192 Complex Points FFT", Proc. of IEEE 1994 Custom Integrated Circuits Conference, pp. 207–210, 1994.
A. Delaruelle, et al., "A Channel Demodulator IC for Digital Audio Broadcasting", Proc. of IEEE 1994 Custom Integrated Circuits Conference, pp. 47–50, 1994.
Bidet, et al., "A Fast Single–Chip Implementation of 8192 Complex Point FFT", IEEE Journal of Solid–State Circuits, vol. 30, No. 3, Mar. 1, 1995.
Polge, R.J.: Bhagavan, B.K.; Carswell, J.M.; "Fast Computational Algorithms for Bit Reversal" IEEE Transactions on Computers, vol. c–23, No. 1, Jan. 1, 1974, pp. 1–9.

*Primary Examiner*—Tan V. Mai
(74) *Attorney, Agent, or Firm*—McDermott, Will & Emery

(57) ABSTRACT

In fast Fourier transform, a necessary memory capacity is decreased, thereby decreasing a cost. The fast Fourier transform is performed on a symbol stored in a RAM by a butterfly operation unit in accordance with a RAM address generated by a RAM address generator. A RAM address conversion unit converts an input/output dummy address into an input/output real address by conducting bit reverse by a frequency specified in accordance with an input/output bit reverse signal, and converts a butterfly operation dummy address into a butterfly operation real address by conducting the bit reverse by a frequency specified in accordance with a butterfly operation bit reverse signal. In this manner, among output data of one symbol and input data of another symbol to be stored in the RAM subsequently to the output data of the one symbol, data having a common index indicating their orders in the symbols can be stored at the same address in the RAM. As a result, symbol input and symbol output can be overlapped.

3 Claims, 36 Drawing Sheets

U.S. PATENT DOCUMENTS

| | | |
|---|---|---|
| 4,138,730 | 2/1979 | Ali . |
| 4,181,976 * | 1/1980 | Collins et al. .................. 708/404 |
| 4,689,762 | 8/1987 | Thibodeau, Jr. . |
| 4,899,301 | 2/1990 | Nishitani et al. . |
| 4,916,649 * | 4/1990 | Yorozu et al. ................. 708/404 |
| 5,012,441 * | 4/1991 | Retter .............................. 708/404 |
| 5,029,079 | 7/1991 | Magar et al. . |
| 5,293,330 | 3/1994 | Sayegh . |
| 5,430,667 | 7/1995 | Takano . |
| 5,491,652 * | 2/1996 | Luo et al. ....................... 708/404 |
| 5,583,803 | 12/1996 | Matsumoto et al. . |
| 6,058,409 * | 5/2000 | Kozaki et al. .................. 708/404 |

* cited by examiner

Fig. 5

| | SYMBOL | CIRCUIT | ARITHMETIC EXPRESSION |
|---|---|---|---|
| RADIX-4 BUTTERFLY OPERATION | x0 — X0<br>x1 — X1<br>x2 — X2<br>x3 — X3 | (circuit diagram) | $X0 = x0+x1+x2+x3$<br>$X1 = x0-j \cdot x1-x2+j \cdot x3$<br>$X2 = x0-x1+x2-x3$<br>$X3 = x0+j \cdot x1-x2-j \cdot x3$ |
| RADIX-2 BUTTERFLY OPERATION | x0 — X0<br>x1 — X1 | (circuit diagram) | $X0 = x0+x1$<br>$X1 = x0-x1$ |
| ROTATOR MULIPLICATION | $y \xrightarrow{W^i} Y$ | (circuit diagram) | $Y = y \cdot W^i$<br>$W = e^{-j \cdot 2\pi/N}$ |

$r(s) =$ (BIT NUMBER CORRESPONDING TO STAGE s)
$= \log_2$ (RADIX OF STAGE s)
($s = 0, 1, \cdots M-1$, M IS THE NUMBER OF STAGES.)

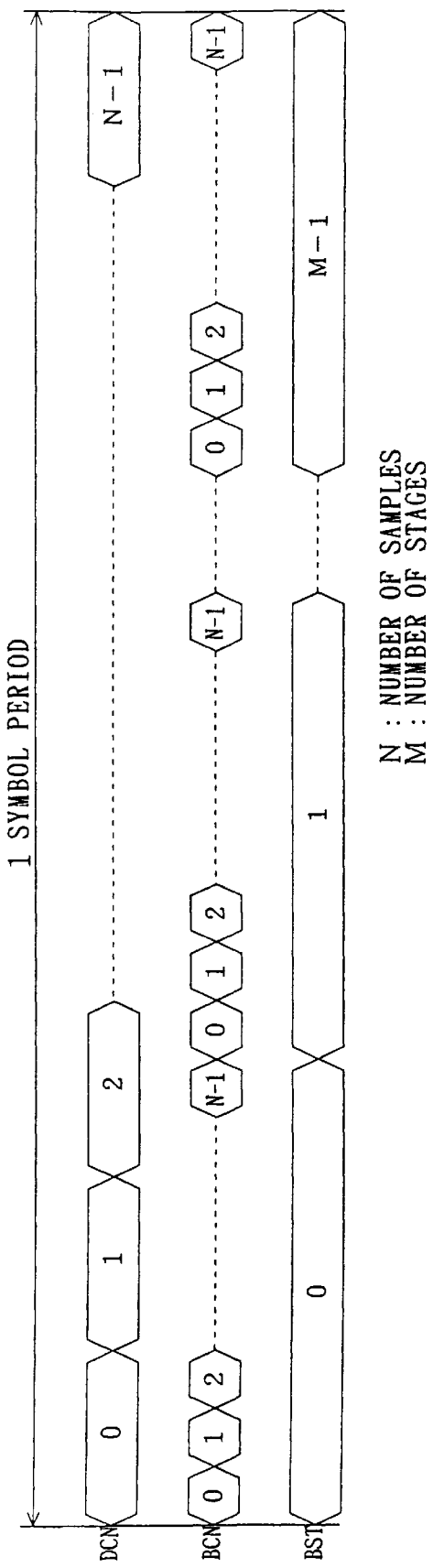

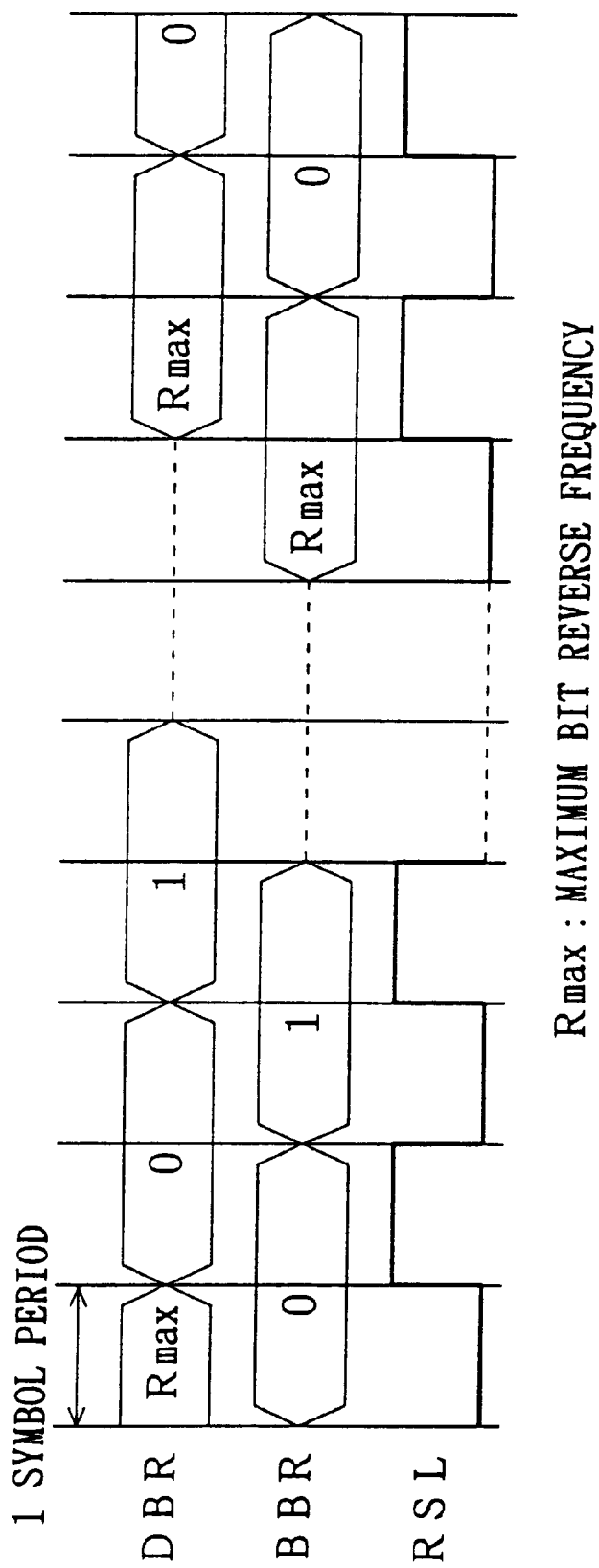

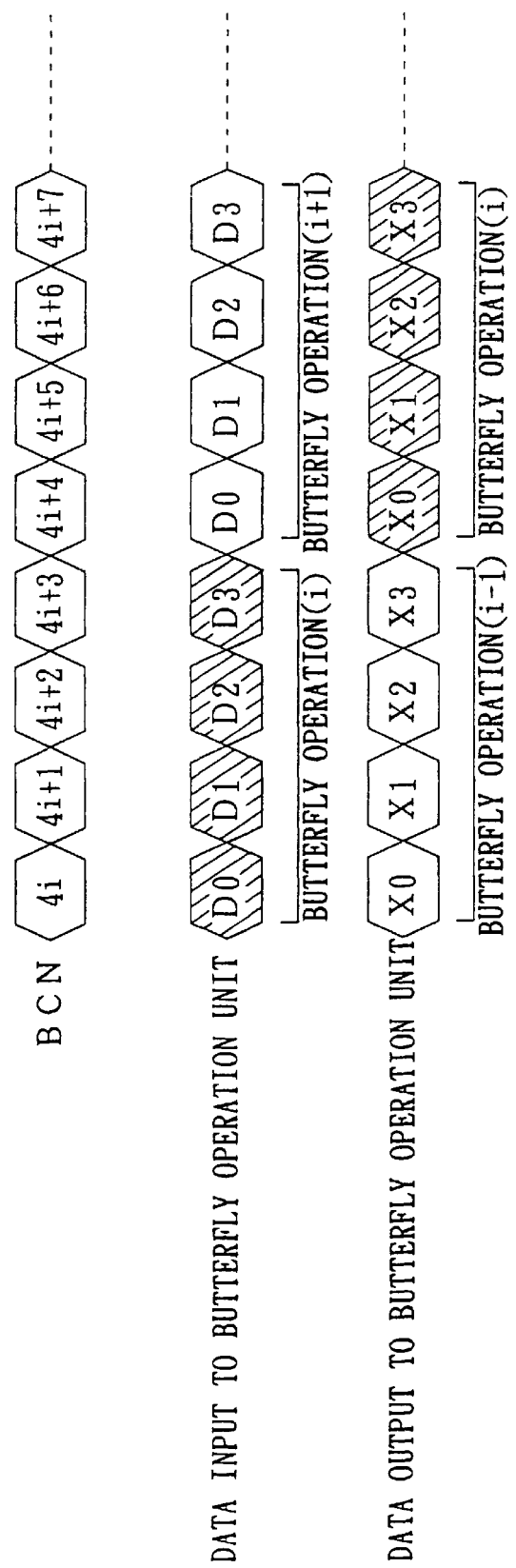

Fig. 18

| DBR | INPUT/OUTPUT DUMMY ADDRESS DAD | | | | | INPUT/OUTPUT REAL ADDRESS RDAD | | | | |
|---|---|---|---|---|---|---|---|---|---|---|
| | [4] | [3] | [2] | [1] | [0] | [4] | [3] | [2] | [1] | [0] |
| 0 | DCN[4] | DCN[3] | DCN[2] | DCN[1] | DCN[0] | DCN[4] | DCN[3] | DCN[2] | DCN[1] | DCN[0] |
| 1 | [4] | [3] | [2] | [1] | [0] | [1] | [0] | [3] | [2] | [4] |
| 2 | [4] | [3] | [2] | [1] | [0] | [2] | [4] | [0] | [3] | [1] |
| 3 | [4] | [3] | [2] | [1] | [0] | [3] | [1] | [4] | [0] | [2] |
| 4 | [4] | [3] | [2] | [1] | [0] | [0] | [2] | [1] | [4] | [3] |

Fig. 19

| BBR | BST | RADIX | BUTTERFLY OPERATION DUMMY ADDRESS BAD | | | | | BUTTERFLY OPERATION REAL ADDRESS RBAD | | | | |
|---|---|---|---|---|---|---|---|---|---|---|---|---|
| | | | [4] | [3] | [2] | [1] | [0] | [4] | [3] | [2] | [1] | [0] |
| | | | BCN[4] | BCN[3] | BCN[2] | BCN[1] | BCN[0] | BCN[4] | BCN[3] | BCN[2] | BCN[1] | BCN[0] |
| 0 | 0 | 4 | [4] | [3] | [2] | [1] | [0] | [2] | [3] | [0] | [4] | [0] |
| 0 | 1 | 4 | [2] | [1] | [0] | [4] | [3] | [1] | [1] | [3] | [2] | [3] |
| 0 | 2 | 2 | [1] | [4] | [3] | [2] | [0] | [1] | [4] | [3] | [2] | [0] |
| 1 | 0 | 4 | [4] | [3] | [2] | [1] | [0] | [4] | [0] | [1] | [2] | [3] |
| 1 | 1 | 4 | [2] | [1] | [0] | [4] | [3] | [2] | [3] | [4] | [0] | [1] |
| 1 | 2 | 2 | [1] | [4] | [3] | [2] | [0] | [2] | [0] | [4] | [3] | [1] |
| 2 | 0 | 4 | [4] | [3] | [2] | [1] | [0] | [3] | [4] | [0] | [1] | [2] |
| 2 | 1 | 4 | [2] | [1] | [0] | [4] | [3] | [3] | [2] | [3] | [4] | [0] |
| 2 | 2 | 2 | [1] | [4] | [3] | [2] | [0] | [1] | [1] | [0] | [4] | [2] |
| 3 | 0 | 4 | [4] | [3] | [2] | [1] | [0] | [4] | [2] | [1] | [0] | [3] |
| 3 | 1 | 4 | [2] | [1] | [0] | [4] | [3] | [0] | [2] | [4] | [3] | [1] |
| 3 | 2 | 2 | [1] | [4] | [3] | [2] | [0] | [0] | [3] | [1] | [0] | [4] |
| 4 | 0 | 4 | [4] | [3] | [2] | [1] | [0] | [3] | [2] | [4] | [2] | [1] |
| 4 | 1 | 4 | [2] | [1] | [0] | [4] | [3] | [3] | [0] | [1] | [4] | [2] |
| 4 | 2 | 2 | [1] | [4] | [3] | [2] | [0] | [0] | [3] | [2] | [1] | [4] |

BIT REVERSE CIRCUIT BR

BIT EXCHANGING CIRCUIT BC

BARREL SHIFTER BS

Fig. 25(a)
N=32

| BIT REVERSE FREQUENCY | BRSEL [3] | [2] | [1] | [0] | BCSEL | BSSEL [1] | [0] |
|---|---|---|---|---|---|---|---|
| 0 | 0 | 0 | 0 | 0 | 0 | 0 | 0 |
| 1 | 0 | 0 | 0 | 1 | 0 | 0 | 0 |
| 2 | 0 | 0 | 1 | 1 | 0 | 0 | 0 |
| 3 | 0 | 1 | 1 | 1 | 0 | 0 | 0 |
| 4 | 1 | 1 | 1 | 1 | 0 | 0 | 0 |

Fig. 25(b)
N=16

| BIT REVERSE FREQUENCY | BRSEL [3] | [2] | [1] | [0] | BCSEL | BSSEL [1] | [0] |
|---|---|---|---|---|---|---|---|
| 0 | 0 | 0 | 0 | 0 | 0 | 0 | 0 |
| 1 | 0 | 0 | 0 | 1 | 0 | 0 | 1 |

Fig. 25(c)
N=8

| BIT REVERSE FREQUENCY | BRSEL [3] | [2] | [1] | [0] | BCSEL | BSSEL [1] | [0] |
|---|---|---|---|---|---|---|---|
| 0 | 0 | 0 | 0 | 0 | 0 | 0 | 0 |
| 1 | 0 | 0 | 0 | 1 | 1 | 1 | 0 |
| 2 | 0 | 0 | 1 | 1 | 1 | 0 | 0 |

Fig. 25(d)
N=4

| BIT REVERSE FREQUENCY | BRSEL [3] | [2] | [1] | [0] | BCSEL | BSSEL [1] | [0] |
|---|---|---|---|---|---|---|---|
| 0 | 0 | 0 | 0 | 0 | 0 | 0 | 0 |
| 1 | 0 | 0 | 0 | 1 | 0 | 1 | 1 |

BIT REVERSE FREQUENCY = 1

BIT REVERSE FREQUENCY = 2

RADIX-2 DECIMATION IN TIME

RADIX-2 DECIMATION IN FREQUENCY

Fig. 35

| | SYMBOL | CIRCUIT | ARITHMETIC EXPRESSION |
|---|---|---|---|
| RADIX-4 BUTTERFLY OPERATION | x0 X0<br>x1 X1<br>x2 X2<br>x3 X3 | (circuit diagram) | X0=x0+x1+x2+x3<br>X1=x0+j·x1−x2−j·x3<br>X2=x0−x1+x2−x3<br>X3=x0−j·x1−x2+j·x3 |
| RADIX-2 BUTTERFLY OPERATION | x0 X0<br>x1 X1 | (circuit diagram) | X0=x0+x1<br>X1=x0−x1 |
| ROTATOR MULIPLICATION | y —Wi→ Y | (circuit diagram) | Y=y·W$^i$<br>W=e$^{j·2\pi/N}$ |

FAST FOURIER TRANSFORMING APPARATUS AND METHOD, VARIABLE BIT REVERSE CIRCUIT, INVERSE FAST FOURIER TRANSFORMING APPARATUS AND METHOD, AND OFDM RECEIVER AND TRANSMITTER

This is a divisional of application Ser. No. 09/010,499, filed Jan. 21, 1998 U.S. Pat. No. 6,115,728.

BACKGROUND OF THE INVENTION

The present invention relates to fast Fourier transforming apparatus and method for performing fast Fourier transform.

In accordance with recent development in digital communication techniques and semiconductor integration techniques, digitalization has been proceeded in television broadcasting and radio broadcasting. In most of digital broadcasting using ground waves, OFDM (orthogonal frequency division multiplex) is adopted for modulation-demodulation. A variety of data can be efficiently transmitted within a limited frequency band by the OFDM, and the OFDM has a characteristic advantageous to the ground waves that it is excellent in avoiding multipath interference. The OFDM, however, requires a large scale of fast Fourier transform of several thousand samples, and hence, decrease in cost of a fast Fourier transforming apparatus is significantly desired for practical use of the OFDM.

An example of a conventional fast Fourier transforming apparatus is described in "A Channel Demodulator IC for Digital Audio Broadcasting" by A. Delaruelle, et al. (IEEE Custom Integrated Circuit Conference, May 1994). This fast Fourier transforming apparatus includes three RAMs (random access memories) as a storage, one of which is an input buffer RAM for storing input data and the other two of which are fast Fourier transform RAMs for storing immediate data obtained during an operation and output data. When data in number corresponding to the number of samples for the Fourier transform is designated as one symbol, in a processing of continuous plural symbols, a current symbol is processed by using the two fast Fourier transform RAMs and input data of a following symbol is stored in the input buffer RAM.

Another example of the conventional fast Fourier transforming apparatus is described in "A Fast Single Chip Implementation of 8192 Complex Points FFT" by E. Bidet, et al. (IEEE Custom Integrated Circuit Conference, May 1994). This fast Fourier transforming apparatus includes, as a storage, pipeline registers at a predetermined number of stages disposed between operators, and each of the operators is pipeline-operated for the processing. When the pipeline registers are used, although this fast Fourier transforming apparatus is equivalent in the memory capacity to the aforementioned apparatus using the two RAMs, the apparatus using the pipeline registers has a problem that the orders of input data and output data are different from each other because data are output in the order of processing. In a fast Fourier transforming apparatus used for modulation-demodulation, it is preferred that the orders of input data and output data are the same for reducing processes after the fast Fourier transform. Therefore, the apparatus additionally includes a data arranging RAM so as to re-arrange the output data. As a result, the memory capacity of the apparatus using the pipeline registers is equivalent to that of the above-described fast Fourier transforming apparatus using the three RAMs.

A fast Fourier transforming apparatus needs a storage for storing input data of one symbol, intermediate data obtained during the operation and output data. Furthermore, a fast Fourier transforming apparatus used for modulation-demodulation is required to process continuous plural symbols, and hence, it additionally needs another storage for storing input data of a following symbol in parallel with the processing of a current symbol. Since these storages occupy a larger part in the entire fast Fourier transforming apparatus, a cost of the fast Fourier transforming apparatus can be decreased by decreasing a necessary memory capacity.

The two exemplified conventional fast Fourier transforming apparatuses are equivalent in their memory capacities. However, in the case where the fast Fourier transforming apparatus is realized by using ASICs or the like, the former that can use a RAM library as a storage is advantageous in decreasing cost. Therefore, the configuration of the former apparatus is generally adopted in using ASICs or the like.

However, the former apparatus requires the three RAMs each having a memory capacity sufficient for storing data of one symbol: one as the input buffer RAM and two as the fast Fourier transform RAMs. As a result, this fast Fourier transforming apparatus has a problem of a large circuit scale. This problem is more serious as the number of samples of every symbol is increased.

In the present invention, the attention is paid to the following point: When input data of one symbol can be written in the fast Fourier transform RAM after reading output data of a previous symbol from the same fast Fourier transform RAM, the fast Fourier transform RAM can also be provided with the function as the input buffer RAM, so that the input buffer RAM can be omitted.

When the input buffer RAM is omitted, the fast Fourier transform is performed as follows: First, input data is stored in the fast Fourier transform RAM, and a butterfly operation is performed with intermediate data stored in this fast Fourier transform RAM. Ultimately, the data stored in the fast Fourier transform RAM is read as output data.

However, there arises another problem in such a case. With regard to the input/output data stored in the fast Fourier transform RAM, an input data and an output data having a common index, which indicates their orders in the symbols, cannot be stored at the same address in the fast Fourier transform RAM due to a characteristic of the fast Fourier transform algorithm. Accordingly, in the general configuration, input data of a following symbol is written in the order of reading addresses of output data stored in the RAM, and hence, the orders of the input data and the output data are different from each other. In order to make the orders of the input data and the output data accord with each other, the input or output data are re-arranged after being stored in the RAM. However, in this case, it is necessary to provide an additional data arranging RAM having a memory capacity sufficient for storing data of one symbol. As a result, the memory capacity cannot be decreased.

SUMMARY OF THE INVENTION

According to the present invention, a necessary memory capacity required in fast Fourier transform is decreased, thereby decreasing a cost.

Specifically the fast Fourier transforming apparatus of this invention for performing the fast Fourier transform comprises a RAM (random access memory) for storing input data of every symbol, one symbol corresponding to a unit of data for fast Fourier transform; and an FFT processor for performing a fast Fourier transform processing (FFT processing) using a butterfly operation on input data stored in the RAM, wherein the RAM stores data resulting from the FFT processing by the FFT processor on input data of one symbol stored in the RAM as output data of the one symbol, and the FFT processor performs the FFT processing in a manner that, among output data of one symbol and input data of another symbol to be stored in the RAM subsequently to the output data of the one symbol, data having a common index indicating orders thereof in the symbols are stored at the same address in the RAM.

In this fast Fourier transforming apparatus, owing to the FFT processing by the FFT processor, among output data of one symbol and input data of a following symbol, data having a common index indicating their orders in the symbols can be stored at the same address in the RAM. Accordingly, a space area of the RAM from which output data is read can be used as an input buffer for storing input data of a following symbol.

Thus, an input buffer RAM can be omitted without additionally providing a data arranging RAM. As a result, a memory capacity required in the fast Fourier transform can be decreased.

Preferably, the FFT processor includes a RAM address generator for generating an access address for the RAM, and makes an access to the RAM in accordance with an address generated by the RAM address generator, and the RAM address generator converts an address to be generated in every symbol, so that, among output data of one symbol and input data of another symbol to be stored in the RAM subsequently to the output data of the one symbol, data having a common index indicating orders thereof in the symbols are stored at the same address in the RAM.

In this manner, among output data of one symbol and input data of a following symbol, data having a common index indicating their orders in the symbols can be stored at the same address in the RAM by converting an access address for the RAM is converted in every symbol by the RAM address generator.

In other words, an operation equivalent to data re-arrangement can be realized by the address conversion.

Furthermore, the RAM address generator preferably converts an address to be generated in every symbol by using bit reverse in which bits of an address are grouped on the basis of a radix of the butterfly operation and an order of the bits is reversed by using each group as a unit.

Also preferably, the FFT processor includes a butterfly operation unit for performing the FFT processing using the butterfly operation on input data stored in the RAM, and the butterfly operation unit is capable of performing plural sorts of FFT processings which use different butterfly operations but are substantially equivalent to one another, and changes the sort of FFT processing to be performed on every symbol so that, among output data bf one symbol and input data of another symbol to be stored in the RAM subsequently to the output data of the one symbol, data having a common index indicating orders thereof in the symbols are stored at the same address in the RAM.

In this manner, among output data of one symbol and input data of a following symbol, data having a common index indicating their orders in the symbols can be stored at the same address in the RAM by changing the sort of FFT processing to be performed on respective symbols by the butterfly operation unit.

The butterfly operation unit preferably alternately performs an FFT processing using a butterfly operation by decimation in frequency and an FFT processing using a butterfly operation by decimation in time on every symbol.

In the present invention, the decimation in time and the decimation in frequency are equivalent to each other as the fast Fourier transform, but the order of the input data of one and the order of output data of the other are symmetrical. Therefore, by alternately adopting the decimation in time and the decimation in frequency, the data re-arrangement can be made unnecessary.

Alternatively, the fast Fourier transforming apparatus of this invention for performing fast Fourier transform (FFT) comprises first and second RAMs (random access memories) for storing input data of every symbol, one symbol corresponding to a unit of data for fast Fourier transform; and an FFT processor for performing a fast Fourier transform processing (FFT processing) using a butterfly operation on input data stored in the first or second RAM, wherein each of the first and second RAMs stores data resulting from the FFT processing by the FFT processor on input data of one symbol stored in the RAM as output data of the one symbol, one of the first and second RAMs is used for the FFT processing of even-numbered symbols and the other is used for the FFT processing of odd-numbered symbols , and the FFT processor performs the FFT processing in a manner that, among output data of an ith symbol (wherein i is a positive integer) and input data of an (i+2)th symbol, data having a common index indicating orders thereof in the symbols are stored at the same address in the first or second RAM.

In this fast Fourier transforming apparatus, owing to the FFT processing by the FFT processor, among output data of an ith symbol and input data of an (i+2)th symbol, data having a common index indicating their orders in the symbols can be stored at the same address in the first or second RAM. Accordingly, a space area of the first or second RAM from which output data is read can be used as an input buffer for storing input data of a following symbol. Thus, an input buffer RAM can be omitted without additionally providing a data arranging RAM. Therefore, in continuous plural symbols, even-numbered symbols are processed by using the first RAM and odd-numbered symbols are processed by using the second RAM, and hence, the configuration using two RAMs can be realized. As a result, a memory capacity required in the fast Fourier transform can be decreased.

The fast Fourier transforming method using a RAM of this invention comprises a first step of storing, in the RAM, pre-transform data of one symbol, one symbol corresponding to a unit of data for fast Fourier transform; a second step of performing a fast Fourier transform processing (FFT processing) using a butterfly operation on the pre-transform data stored in the RAM in the first step and storing resultant transformed data in the RAM; a third step of reading, from the RAM, the resultant transformed data stored in the RAM in the second step, wherein the first through third steps are repeatedly conducted, and an access address for the RAM is converted in every repeat, so that, among resultant transformed data stored in the RAM in an Nth repeat (wherein N is a positive integer) and pre-transform data stored in the RAM in an (N+1)th repeat, data having a common index indicating orders thereof in the symbols are stored at the same address of the RAM.

In this method, since an access address for the RAM is converted in every repeat, among output data of one symbol and input data of a following symbol, data having a common index indicating their orders in the symbol can be stored at the same address in the RAM. In other words, an operation equivalent to the data re-arrangement can be realized by the address conversion. Therefore, a space area of the RAM from which output data is read can be used as an input buffer for storing input data of a following symbol. Thus, an input buffer RAM can be omitted without additionally providing a data arranging RAM. As a result, a memory capacity required in the fast Fourier transform can be decreased.

Alternatively, the fast Fourier transforming method using a RAM of this invention comprises a first step of storing, in the RAM, pre-transform data of one symbol, one symbol corresponding to a unit of data for fast Fourier transform; a second step of performing a fast Fourier transform processing (FFT processing) using a butterfly operation on the pre-transform data stored in the RAM in the first step and storing resultant transformed data in the RAM; and a third step of reading, from the RAM, the resultant transformed data stored in the RAM in the second step, wherein the first through third steps are repeatedly conducted, in the second step, plural sorts of FFT processings which use different butterfly operations but are substantially equivalent to one another are adoptable, and the sort of FFT processing to be performed is changed in every repeat, so that, among resultant transformed data stored in the RAM in an Nth repeat (wherein N is a positive integer) and pre-transform data stored in an (N+1)th repeat, data having a common index indicating orders thereof in the symbols are stored at the same address of the RAM.

In this method, since the sort of FFT processing to be performed is changed in every repeat, among output data of one symbol and input data of a following symbol, data having a common index indicating their orders in the symbols can be stored at the same address in the RAM. Therefore, a space area of the RAM from which output data is read can be used as an input buffer for storing input data of a following symbol. Thus, an input buffer RAM can be omitted without additionally providing a data arranging RAM. As a result, a memory capacity required in the fast Fourier transform can be decreased.

Alternatively, the variable bit reverse circuit of this invention, which is included in the aforementioned fast Fourier transforming apparatus, for conducting bit reverse for a butterfly operation by a specified frequency, comprises serially connected plural bit reverse circuits each of which conducts one bit reverse, wherein, among the plural bit reverse circuits, bit reverse circuits in number corresponding to the specified frequency conduct the bit reverse and remaining bit reverse circuits allow data to pass therethrough.

Moreover, the OFDM receiver of this invention for demodulating a received OFDM signal into received data comprises a digital demodulation unit for demodulating an OFDM signal into a base band signal; and a fast Fourier transform unit for decoding complex data of carriers by performing fast Fourier transform on the base band signal obtained through demodulation by the digital demodulation unit, received data being generated on the basis of the complex data of the carriers, wherein the fast Fourier transform unit is composed of the aforementioned fast Fourier transforming apparatus.

In addition, the aforementioned apparatuses and methods regarding the fast Fourier transform can be similarly applied to inverse fast Fourier transform.

Therefore, the OFDM transmitter of this invention for modulating data to be transmitted into an OFDM signal, comprises an inverse fast Fourier transform unit for performing inverse fast Fourier transform on complex data of carriers generated from data to be transmitted; and a digital modulation unit for generating an OFDM signal by frequency-converting output of the inverse fast Fourier transform unit, wherein the inverse fast Fourier transform unit is composed of an inverse fast Fourier transforming apparatus obtained by applying the above-described fast Fourier transforming apparatus.

BRIEF DESCRIPTION OF THE DRAWINGS

FIG. 5 is a diagram for illustrating operation elements in the signal flow graph;

FIG. 14 is a timing chart for showing signals for controlling a RAM address generator 105 which are generated and output by a control unit 106 of the fast Fourier transforming apparatus of the first embodiment shown in FIG. 1;

FIG. 15 is a timing chart for showing other signals for controlling the RAM address generator 105 which are generated and output by the control unit 106 of the fast Fourier transforming apparatus of the first embodiment shown in FIG. 1;

FIG. 16 is a timing chart for showing an operating timing of a butterfly operation unit 103 of the fast Fourier transforming apparatus of the first embodiment shown in FIG. 1;

FIGS. 17(a) and 17(b) are diagrams for showing examples of the configuration of first and second variable bit reverse units 113 and 114 of the fast Fourier transforming apparatus of the first embodiment shown in FIG. 1, wherein FIG. 17(a) shows the configuration of a selector system and FIG. 17(b) shows the configuration of a table system;

FIG. 18 is a diagram for showing an input/output address generating operation by an input/output address generation unit 111 and the first variable bit reverse unit 113 of the fast Fourier transforming apparatus of the first embodiment, for showing correspondence of an input/output timing signal DCN and an input/output bit reverse signal DBR to an input/output dummy address DAD and an input/output real address RDAD;

FIG. 19 is a diagram for showing a butterfly operation address generating operation by a butterfly address generation unit 112 and the second variable bit reverse unit 114 of the fast Fourier transforming apparatus of the first embodiment, for showing correspondence of a butterfly operation timing signal BCN, a butterfly operation stage signal BST and a butterfly operation bit reverse signal BBR to a butterfly operation dummy address BAD and a butterfly operation real address RBAD;

FIGS. 24(a) through 24(c) are circuit diagrams for showing configurations of circuits included in the variable bit reverse circuit of FIG. 23, wherein FIG. 24(a) shows the configuration of a bit reverse circuit BR, FIG. 24(b) shows the configuration of a bit exchanging circuit BC and FIG. 24(c) shows the configuration of a barrel shifter BS;

FIGS. 25(a) through 25(d) are diagrams for showing set values of respective control signals in the variable bit reverse circuit of FIG. 23, wherein FIG. 25(a) shows the values set when the number N of samples is 32, FIG. 25(b) shows the values set when the number N of samples is 16, FIG. 25(c) shows the values set when the number N of samples is 8 and FIG. 25(d) shows the values set when the number N of samples is 4;

FIGS. 26(a) and 26(b) are diagrams for showing the operation of the variable bit reverse circuit of FIG. 23 on samples in number N of 8, wherein FIG. 26(a) shows the operation conducted when a bit reverse frequency is 1 and FIG. 26(b) shows the operation conducted when the bit reverse frequency is 2;

FIGS. 27(a) and 27(b) are diagrams for showing the operation of the variable bit reverse circuit of FIG. 23 conducted when the number N of samples is 8 and bit exchange is not executed, wherein FIG. 27(a) shows the operation conducted when the bit reverse frequency is 1 and FIG. 27(b) shows the operation conducted when the bit reverse frequency is 2;

FIG. 32(a) and 32(b) are signal flow graphs for showing examples of the fast Fourier transform algorithm, wherein FIG. 32(a) is a signal flow graph of radix-2 decimation in time and FIG. 32(b) is a signal flow graph of radix-2 decimation in frequency;

FIG. 35 is a diagram of operation elements in a signal flow graph of the fast Fourier transform;

DETAILED DESCRIPTION OF THE INVENTION

Embodiment 1

A fast Fourier transforming apparatus according to a first embodiment of the invention will now be described with reference to the accompanying drawings.

Figure 1:
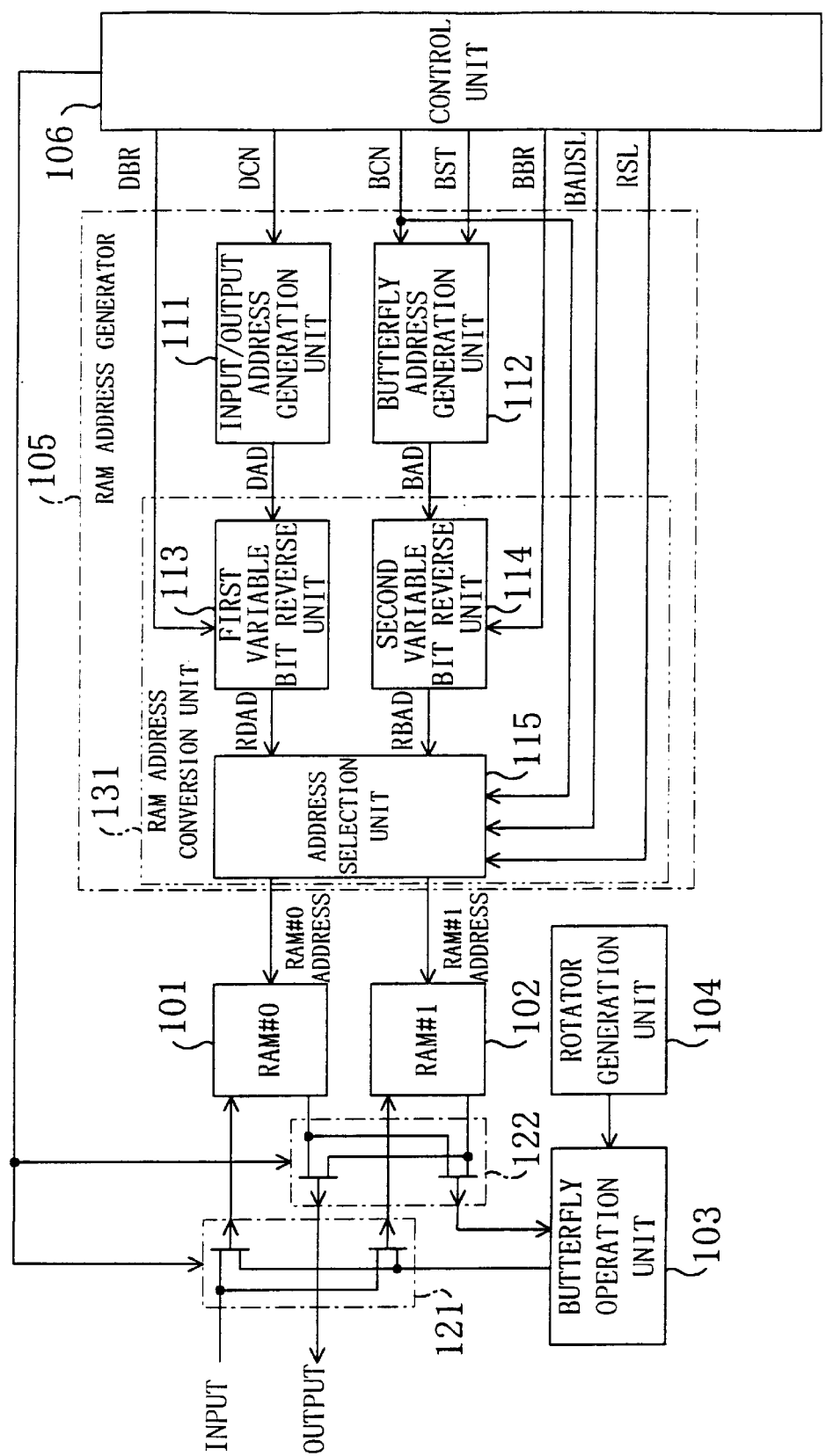
FIG. 1 is a block diagram for showing the configuration of a fast Fourier transforming apparatus according to a first embodiment of the invention.

FIG. 1 is a block diagram for showing the configuration of the fast Fourier transforming apparatus of the first embodiment. In FIG. 1, reference numerals 101 and 102 denote first and second RAMs (which are shown as RAM#0 and RAM#1 in FIG. 1) for storing input/output data and intermediate data obtained during a butterfly operation, a reference numeral 103 denotes a butterfly operation unit for performing the butterfly operation, a reference numeral 104 denotes a rotator generation unit for generating a rotator used in the butterfly operation, a reference numeral 105 denotes a RAM address generator for generating addresses for accessing the first and second RAMs 101 and 102, and a reference numeral 106 denotes a control unit for controlling the RAM address generator 105 and the like.

The RAM address generator 105 includes an input/output address generation unit 111 for generating an input/output dummy address DAD used as a RAM address reference in data input/output; a butterfly address generation unit 112 for generating a butterfly operation dummy address BAD used as a RAM address reference in the butterfly operation; a first variable bit reverse unit 113 for generating an input/output real address RDAD by conducting bit reverse (described in detail below) on the input/output dummy address DAD generated by the input/output address generation unit 111 by the number of times, that is, frequency specified in accordance with an input/output bit reverse signal DBR; a second variable bit reverse unit 114 for generating a butterfly operation real address RBAD by conducting the bit reverse on the butterfly operation dummy address BAD generated by the butterfly address generation unit 112 by a frequency specified in accordance with a butterfly operation bit reverse signal BBR; and an address selection unit 115 for receiving the input/output real address RDAD output by the first variable bit reverse unit 113 and the butterfly operation real address RBAD output by the second variable bit reverse unit 114 and selectively outputting one of them as an address for the first RAM 101 and the other as an address for the second RAM 102. The first and second variable bit reverse units 113 and 114 and the address selection unit 115 together form a RAM address convertor 131.

Also, a reference numeral 121 denotes a first data selection unit for receiving input data for the fast Fourier transforming apparatus and data resulting from the butterfly operation by the butterfly operation unit 103 and selectively outputting one of them as input data for the first RAM 101 and the other as input data for the second RAM 102, and a reference numeral 122 denotes a second data selection unit for receiving output data of the first and second RAMs 101 and 102 and selectively outputting one of them as output data of the fast Fourier transforming apparatus and the other as input data for the butterfly operation unit 103.

The butterfly operation unit 103, the rotator generation unit 104, the RAM address generator 105, the control unit 106 and the first and second data selection units 121 and 122 together form an FFT processor.

Now, the operation of the fast Fourier transforming apparatus having the aforementioned configuration will be described. In the following description, data in number corresponding to the number of samples for the Fourier transform is designated as one symbol.

Figure 2:
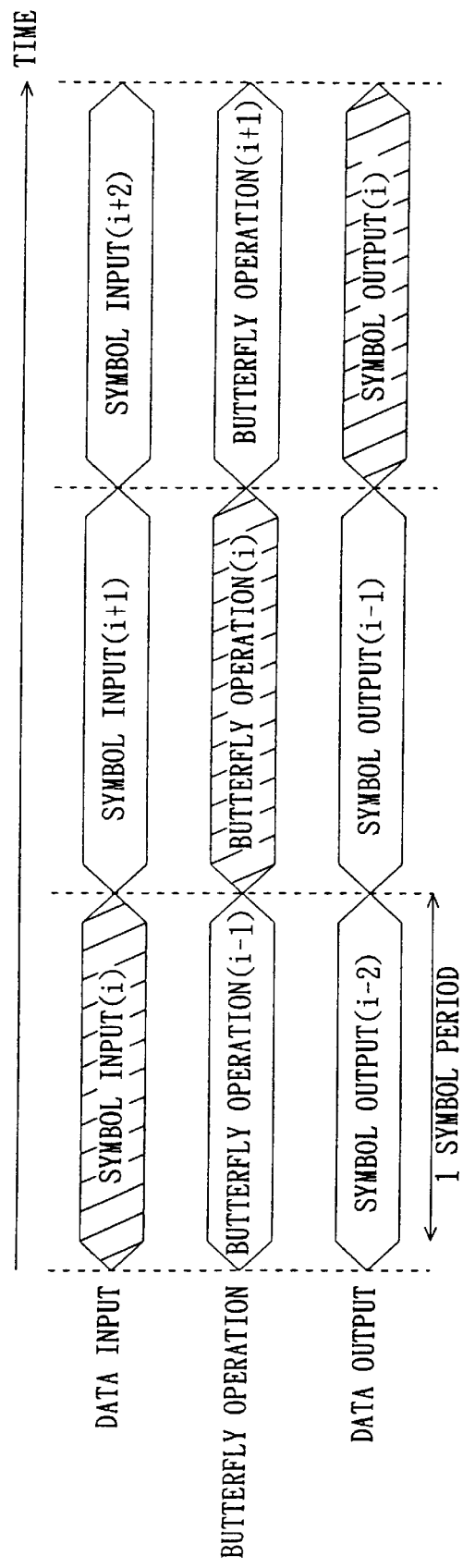
FIG. 2 is a timing chart for showing a processing timing in the fast Fourier transforming apparatus of the first embodiment.

FIG. 2 is a timing chart for showing a processing timing in the fast Fourier transforming apparatus of this embodiment. In this embodiment, as is shown in FIG. 2, in a processing of the ith symbol (wherein i is an integer), after inputting the symbol, the butterfly operation is performed on the ith symbol during input of the (i+1)th symbol, and the symbol resulting from the Fourier transform is output during input of the (i+2)th symbol (which processing corresponds to hatched portions in FIG. 2). In other words, in this embodiment, when a time period for inputting one symbol is designated as one symbol period, input of one symbol, the butterfly operation of a preceding symbol and output of a further preceding symbol are simultaneously performed in one symbol period, that is to say, during a period of inputting an ith symbol, the butterfly operation of the (i−1)th symbol and the output of the (i−2)th symbol are conducted in parallel.

In this embodiment, the aforementioned operation of the fast Fourier transforming apparatus is realized by appropriately switching the two RAMs 101 and 102.

Figure 3:
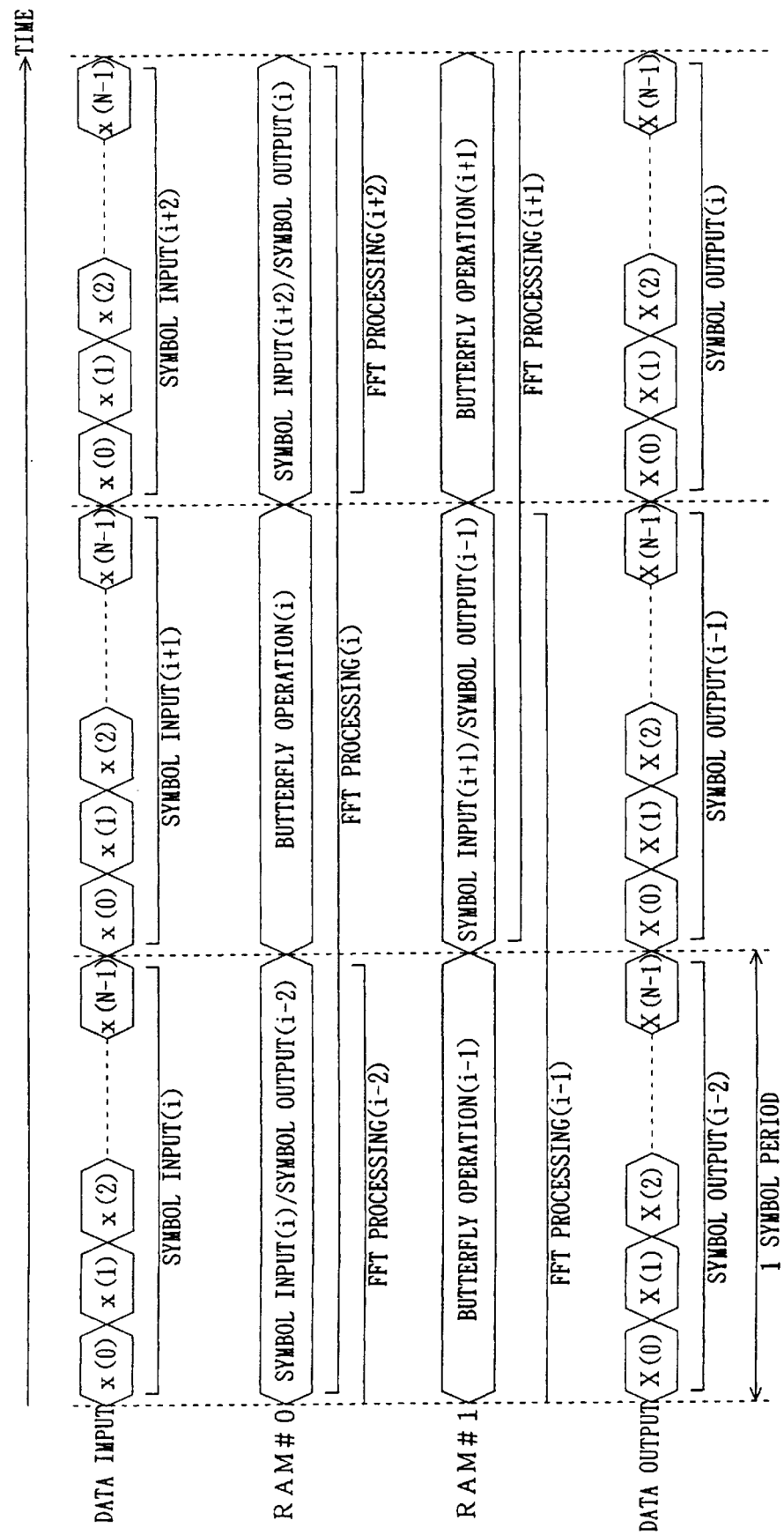
FIG. 3 is a timing chart for showing a RAM switching timing in the fast Fourier transforming apparatus of the first embodiment.

FIG. 3 is a timing chart for showing a RAM switching timing in the fast Fourier transforming apparatus of this embodiment. FIG. 3 shows the RAM switching timing in performing the fast Fourier transform of N samples (wherein N is a positive integer), wherein $x(0)$ through $x(N-1)$ indicate input data (pre-transform data) in every symbol, and $X(0)$ through $X(N-1)$ indicate output data (post-transform data) in every symbol. Also, an "FFT processing (i)" (wherein i is an integer) means the fast Fourier transform of an ith symbol.

In this embodiment, among the two RAMs 101 and 102 (i.e., RAM#0 and RAM#1), one is used for the fast Fourier transform of even-numbered symbols and the other is used for the fast Fourier transform of odd-numbered symbols. As is shown in FIG. 3, in the FFT processing (i), in a period of inputting the ith symbol, input data $x(0)$ through $x(N-1)$ are stored in the first RAM 101 (symbol input (i)); in a period of inputting the (i+1)th symbol, the butterfly operation is performed on the ith symbol with intermediate data stored in the first RAM 101 ("butterfly operation (i)"); and in a period of inputting the (i+2)th symbol, data stored in the first RAM 101 are read as the output data $X(0)$ through $X(N-1)$ ("symbol output (i)"). Similarly, an FFT processing (i−2) and an FFT processing (i+2) are executed by using the first RAM 101, whereas an FFT processing (i−1) and an FFT processing (i+1) are executed by using the second RAM 102.

Furthermore, the symbol input (i) and symbol output (i−2) are performed in parallel in one symbol period by using the same RAM. As a result, the two RAMs 101 and 102 are alternately switched in respective symbol periods to be used as a symbol input/output RAM or a butterfly operation RAM. The two RAMs 101 and 102 are thus switched by the data selection units 121 and 122.

Since the symbol input and the symbol output are thus overlapped, one symbol period can be utilized as a period for the butterfly operation, which requires a large number of RAM accesses and calculations. As a result, the operation speed required of the first and second RAMs 101 and 102 can be decreased and the circuit scale of the butterfly operation unit 103 can be decreased.

Figure 4:
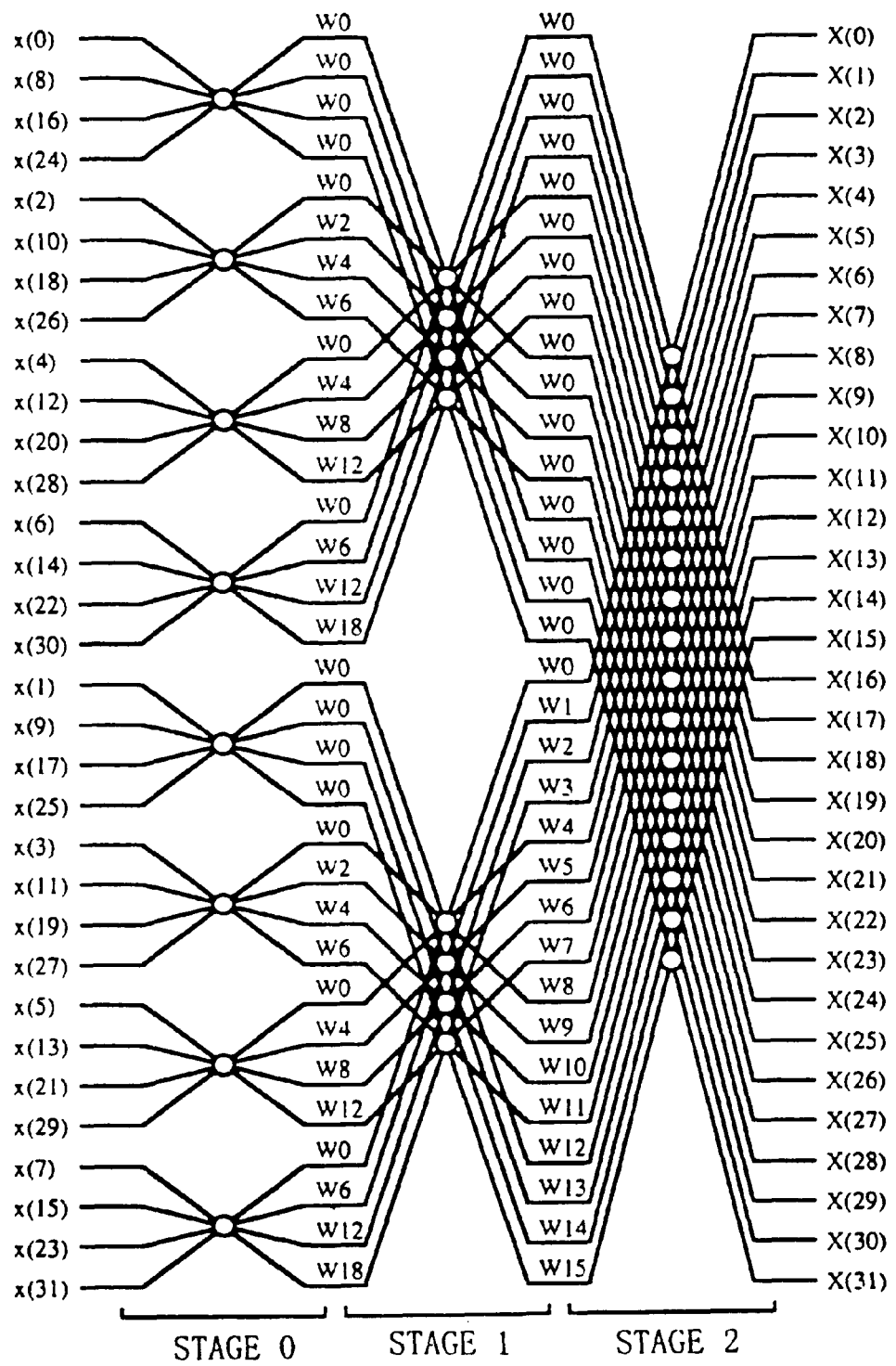
FIG. 4 is a signal flow graph for showing radix-4×2 decimation in time described as an example of the fast Fourier transform algorithm.

FIG. 4 is a signal flow graph for showing radix-4×2 decimation in time as an example of the fast Fourier transform algorithm, and FIG. 5 is a diagram for showing operation elements in the signal flow graph. FIG. 4 shows the signal flow graph adopted when the number N of samples is 32, wherein $x(0)$ through $x(N-1)$ indicate pre-transform input data, $X(0)$ through $X(N-1)$ indicate post-transform output data, and Wi indicates a coefficient of rotator multiplication. A "radix-4×2" operation means an operation combining a radix-4 butterfly operation and a radix-2 butterfly operation.

As is shown in FIG. 4, in the fast Fourier transform algorithm, the butterfly operation of several stages and the rotator multiplications between the stages are executed on the input data $x(0)$ through $x(N-1)$, thereby generating the output data $X(0)$ through $X(N-1)$. In the radix-4×2 decimation in time shown in FIG. 4, the radix-4 butterfly operation is performed in former two stages (i.e., a stage 0 and a stage 1), and the radix-2 butterfly operation is performed in the last stage (i.e., a stage 2).

Furthermore, as is shown in FIG. 5, respective operations are conducted in accordance with the following arithmetic expressions:

<Radix-4 butterfly operation>
$X0 = x0 + x1 + x2 + x3$
$X1 = x0 - j \cdot x1 - x2 + j \cdot x3$
$X2 = x0 - x1 + x2 - x3$
$X3 = x0 + j \cdot x1 - x2 - j \cdot x3$ <Radix-2 butterfly operation>
$X0 = x0 + x1$
$X1 = x0 - x1$ <Rotator multiplication>
$Y = y \cdot W^i$
$W = e^{-j \cdot 2\pi/N}$ The fast Fourier transform algorithm has a characteristic that the orders of the input data $x(0)$ through $x(N-1)$ and the output data $X(0)$ through $X(N-1)$ are different from each other. In the radix-4×2 decimation in time of FIG. 4, the output data $X(j)$ are arranged downward in the ascending order of j=0, 1, 2, 3, . . . , etc., whereas the input data $x(j)$ are arranged downward in a discontinuous order of j=0, 8, 16, 24, . . . , etc.

In order to make the symbol input and the symbol output overlapped, it is necessary to read output data and write input data in parallel. For this purpose, among output data of one symbol and input data of a following symbol, data having a common index indicating their orders in the symbols are required to be stored at the same address in the RAM. Accordingly, in order to make the storing order of the input data accord with the storing order of output data, the data are conventionally required to be re-arranged in the fast Fourier transform algorithm as is shown in FIG. 4 so that, for example, the input data x(j) can be arranged downward in the ascending order of j=0, 1, 2, 3, . . . , etc. in the same manner as the output data X(j).

In contrast, in this embodiment, the re-arrangement of the data is unnecessary because a processing equivalent to the data re-arrangement is realized by converting an address for accessing the RAM in every symbol by the bit reverse. Specifically, an address for accessing the RAM is converted in every symbol by changing the number of repeating times of the bit reverse on a reference address in every symbol (which is designated as variable bit reverse).

Figure 6:
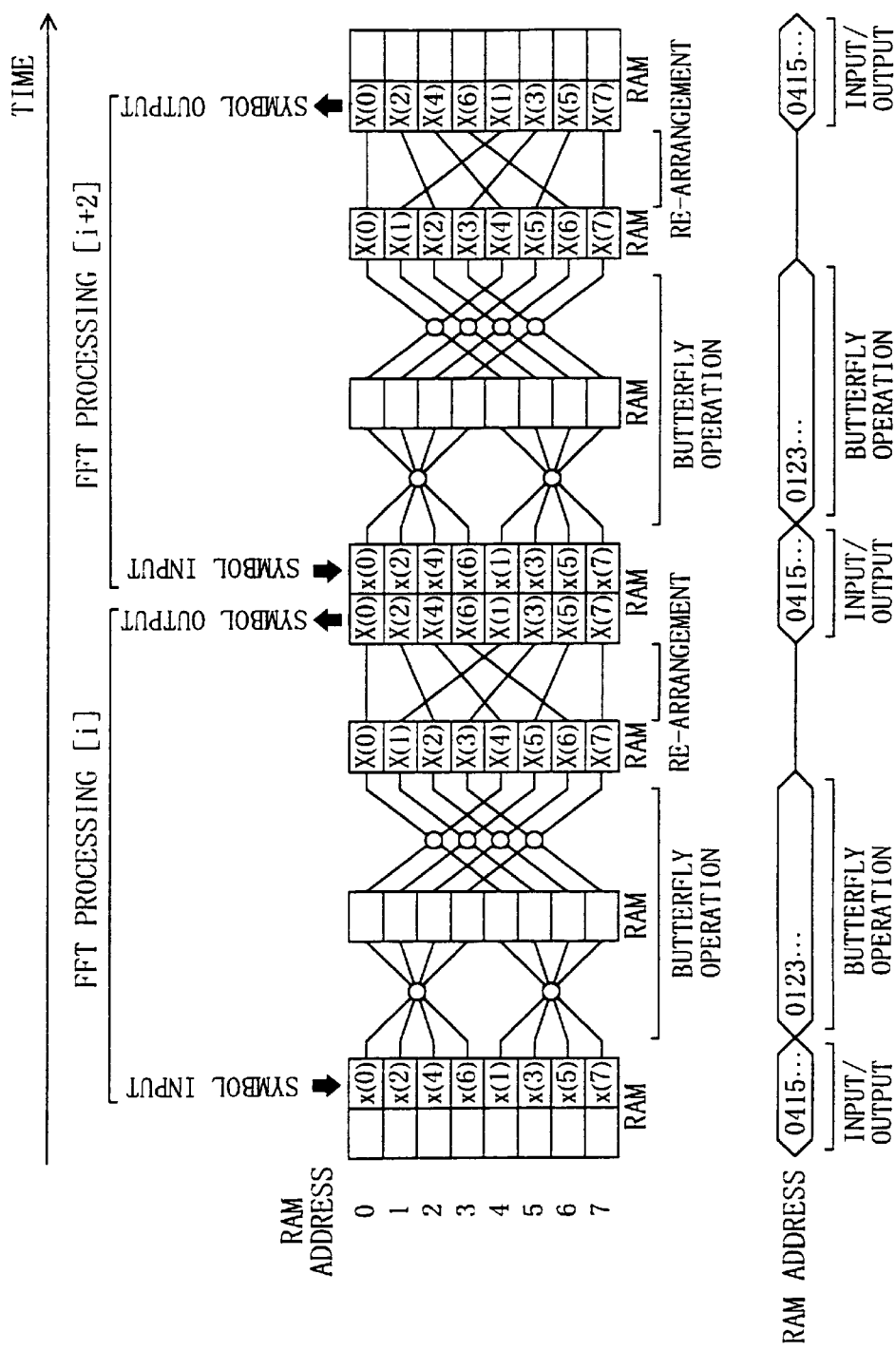
FIG. 6 is a diagram for illustrating inter-RAM data transfer performed without variable bit reverse of an address.
Figure 7:
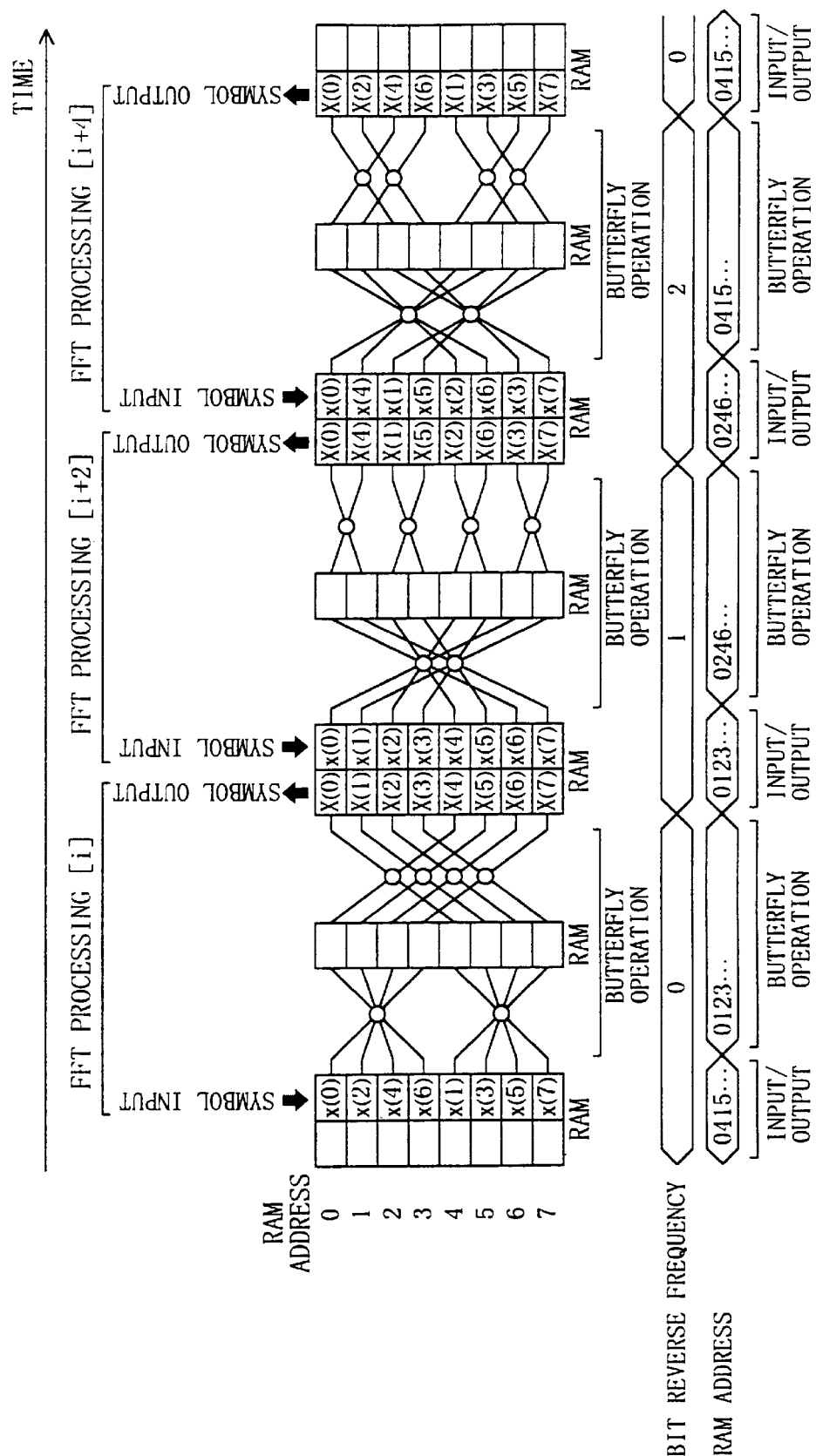
FIG. 7 is a diagram for illustrating inter-RAM data transfer performed with variable bit reverse of an address.

FIGS. 6 and 7 are diagrams for showing an effect attained by the variable bit reverse of the addresses in this embodiment, wherein FIG. 6 is a diagram for showing inter-RAM data transfer without the variable bit reverse of addresses and FIG. 7 is a diagram for showing inter-RAM data transfer with the variable bit reverse of addresses. In both FIGS. 6 and 7, the number N of samples is 8, and the data transfer of merely one of the RAMs included in the fast Fourier transforming apparatus is shown. This RAM stores input/output data of even- or odd-numbered symbols and intermediate data obtained from the butterfly operation on the input data of these symbols.

In the FFT processing [i], that is, the fast Fourier transform of the ith symbol, after input data x(0) through x(7) are stored in the RAM as the symbol input, the butterfly operation is performed on the input data x(0) through x(7) with intermediate data stored in the RAM, and output data X(0) through X(7) stored in the RAM are read as the symbol output.

In this case, in the inter-RAM data transfer without the variable bit reverse of addresses as is shown in FIG. 6, an output data X(k) of the FFT processing [i] and an input data x(k) of the FFT processing [i+2] are not necessarily stored at the same addresses of the RAM. Accordingly, the data are required to be re-arranged in order to store the input data x(k) of the FFT processing [i+2] in the same addresses from which the output data X(k) of the FFT processing [i] are read.

On the other hand, in the inter-RAM data transfer with the variable bit reverse of addresses of this embodiment as is shown in FIG. 7, an input/output address and a butterfly operation address are varied in each FFT processing by the bit reverse, so that the RAM address from which the output data X(k) of the FFT processing [i] is read can be the same as the RAM address at which the input data x(k) of the FFT processing [i+2] is stored. Accordingly, after reading the output data X(k) of the FFT processing [i], the input data x(k) of the FFT processing [i+2] can be stored at the same address. Thus, the input of a symbol and the output of another symbol preceding by two symbols can be overlapped.

The variation of the input/output address and the butterfly operation address are controlled in accordance with the number of times, namely, frequency of the bit reverse. The bit reverse frequency is incremented in each FFT processing, and after attaining the maximum bit reverse frequency Rmax (wherein Rmax is a positive integer), it is initialized to be 0. The maximum bit reverse frequency Rmax can be obtained by subtracting one from a frequency required to return to an original address by repeating the bit reverse, and can be determined in accordance with the number of samples, the type of the butterfly operation used for the FFT processing and the like. In the bit reverse exemplified in FIG. 7, the maximum bit reverse frequency Rmax is 2, and the bit reverse frequency is updated in each FFT processing so as to be repeatedly varied from 0 to 2.

Figure 8:
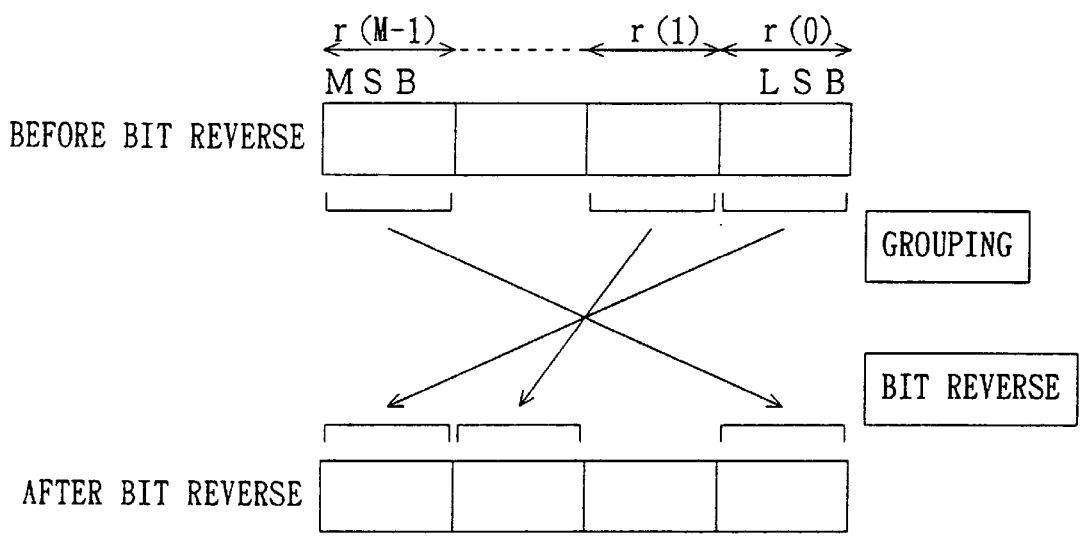
FIG. 8 is a diagram for showing the outline of bit reverse.

FIG. 8 is a diagram for showing the outline of the bit reverse. The bit reverse is a method of calculating the order of data necessary for the fast Fourier transform on the basis of the inputting order of the data. Specifically, as is shown in FIG. 8, binary bits indicating the inputting order of the data are first grouped successively from the LSB so that obtained groups can correspond to the respective stages of the butterfly operation. When a bit number corresponding to a stage s is indicated as r(s), the following relationship holds:

$$r(s)=\log_2(\text{radix of the stage s}) \qquad (1)$$

wherein s is 0, 1, . . . , or M−1, wherein M is the number of stages. Then, the thus obtained groups of the bits are reversed in their positions with the bit positions in each group unchanged. Thus, the bit reverse is conducted.

Figure 9:
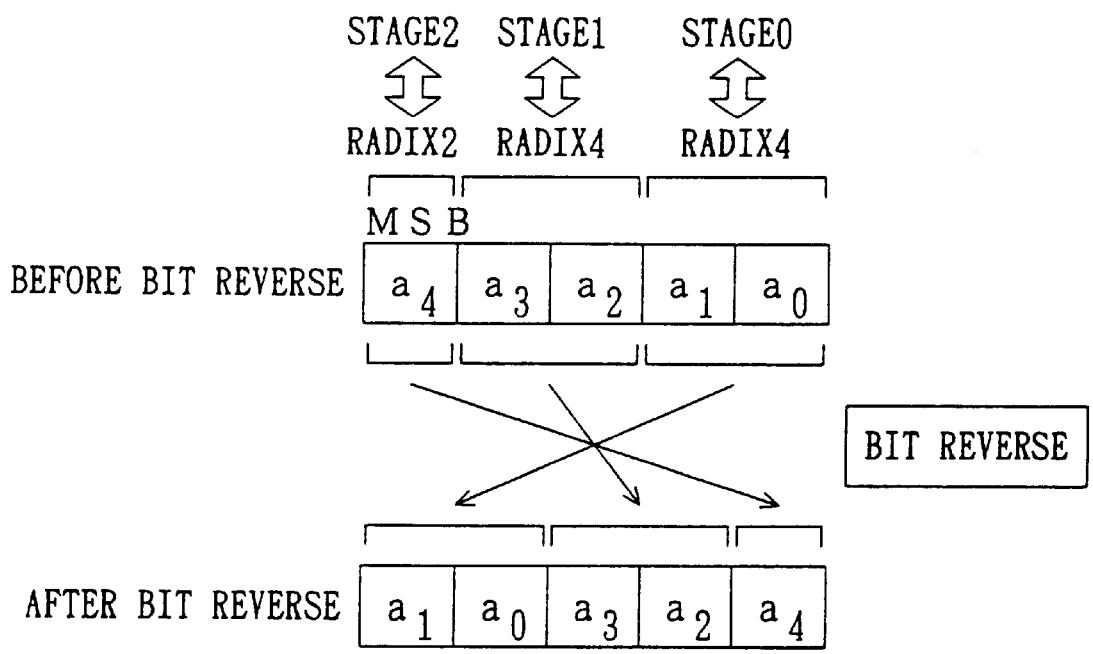
FIG. 9 is a diagram for showing an example of the bit reverse, which is conducted in the radix-4×2 decimation in time when a number N of samples is 32.

FIG. 9 is a diagram for showing an example of the bit reverse, which is conducted in the radix-4×2 decimation in time on 32 samples as is shown in FIG. 4. In the case where the number N of samples is 32, $$N=32=2^5$$

and therefore, the binary indicating the inputting order of the data is 5 bits. First, the binary is grouped successively from the LSB so that the groups can correspond to the respective stages of the butterfly operation. As is shown in FIG. 4, the radix-4 butterfly operation is performed in the stages 0 and 1 and the radix-2 butterfly operation is performed in the stage 2. Therefore, on the basis of formula (1), the following is obtained:

$$r(0)=r(1)=\log_2 4=2$$

$$r(2)=\log_2 2=1$$

Accordingly, the binary indicating the inputting order of the data is grouped successively from the LSB into a group of two bits, a group of two bits and a group of one bit. Then, with the bit positions in each group unchanged, the upper group is exchanged with the lower group, thereby conducting the bit reverse. As a result, a bit string a4 a3 a2 a1 a0 before conducting the bit reverse is converted into a bit string a1 a0 a3 a2 a4 through the bit reverse.

This embodiment adopts the variable bit reverse in which the bit reverse as is shown in FIGS. 8 and 9 is repeatedly conducted, so that the RAM addresses in the data input/output and the butterfly operation are appropriately converted.

Figure 10:
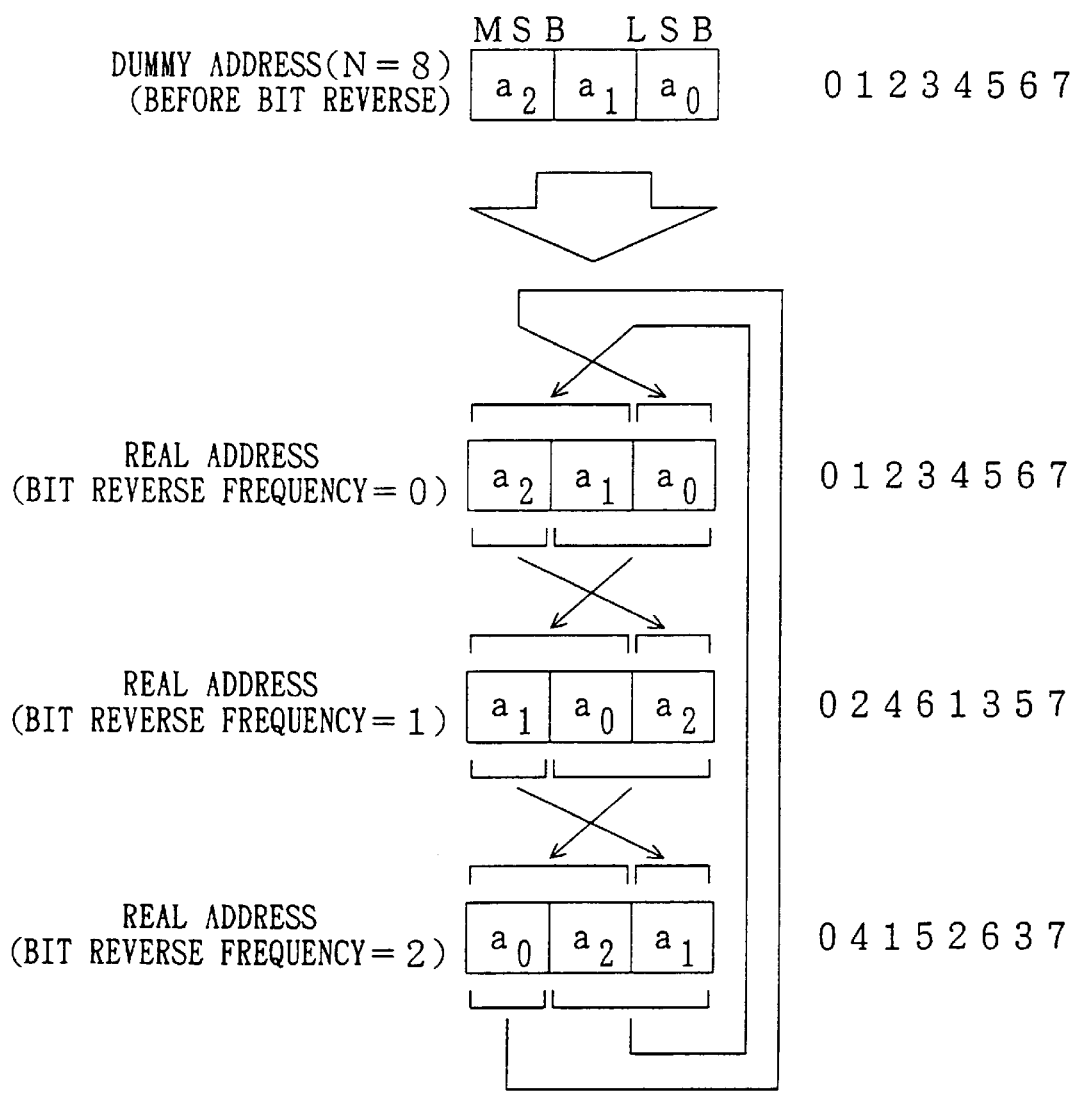
FIG. 10 is a diagram for showing an example of variation of an address by variable bit reverse correspondingly to the inter-RAM data transfer of FIG. 7.

FIG. 10 is a diagram for showing an example of the variation of an address by the variable bit reverse, shown correspondingly to the inter-RAM data transfer of FIG. 7. Since FIG. 7 shows the inter-RAM data transfer conducted in the radix-4×2 decimation in time on 8 samples, the bit number of the address is obtained as 3 bits as follows:

$$N=8=2^3$$

The 3 bits of the address are grouped successively from the LSB into a group of two bits and a group of one bit, and the groups are reversed. Accordingly, on the basis of a dummy address a2 a1 a0 before conducting the bit reverse, real addresses a2 a1 a0 (with the bit reverse frequency of 0), a1 a0 a2 (with the bit reverse frequency of 1) and a0 a2 a1 (with the bit reverse frequency of 2) are generated through the bit reverse. Also, a numeral string added at the right side of each address bit corresponds to the order of address expressed by using a decimal number in accordance with the address bit.

Figure 11:
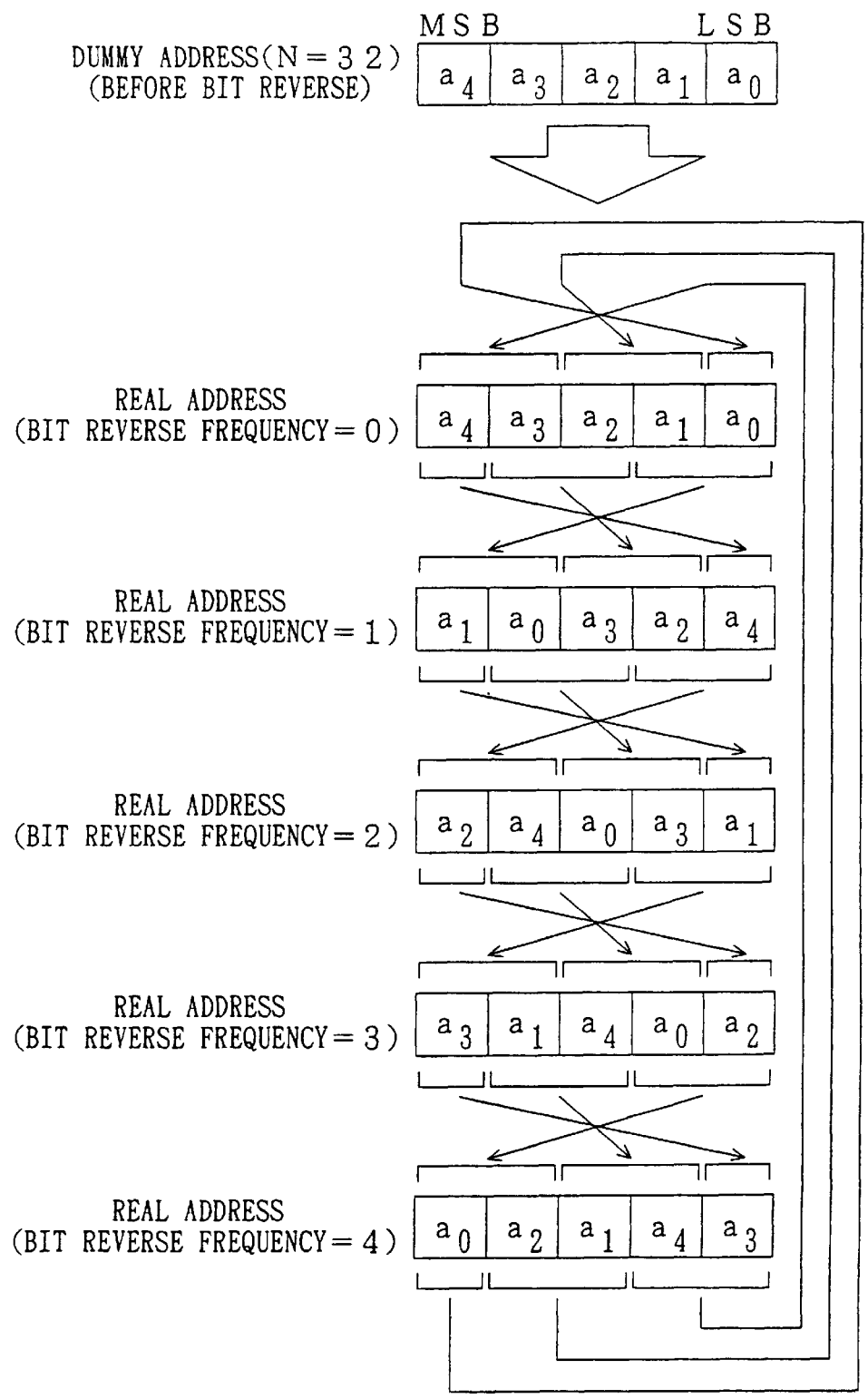
FIG. 11 is a diagram for showing variation of an address by the variable bit reverse, shown correspondingly to inter-RAM data transfer conducted by the radix-4×2 decimation in time when the number N of samples is 32.

FIG. 11 is a diagram for showing another example of the variation of an address by the variable bit reverse, shown correspondingly to inter-RAM data transfer adopted in the radix-4×2 decimation in time on 32 samples. In FIG. 11, since the number N of samples is 32 ($=2^5$), the bit number of the address is 5. When it is assumed that the radix-4 butterfly operation is performed in the stages 0 and 1 and that the radix-2 butterfly operation is performed in the stage 2, the 5 bits of the address are grouped successively from the LSB into a group of two bits, a group of two bits and a group of one bit, and the groups are reversed. Accordingly, on the basis of a dummy address a4 a3 a2 a1 a0 before conducting the bit reverse, a real address a4 a3 a2 a1 a0 (with the bit reverse frequency of 0), a real address a1 a0 a3 a2 a4 (with the bit reverse frequency of 1), a real address a2 a4 a0 a3 a1 (with the bit reverse frequency of 2), a real address a3 a1 a4 a0 a2 (with the bit reverse frequency of 3) and a real address a0 a2 a1 a4 a3 (with the bit reverse frequency of 4) can be generated through the bit reverse.

Figure 12:
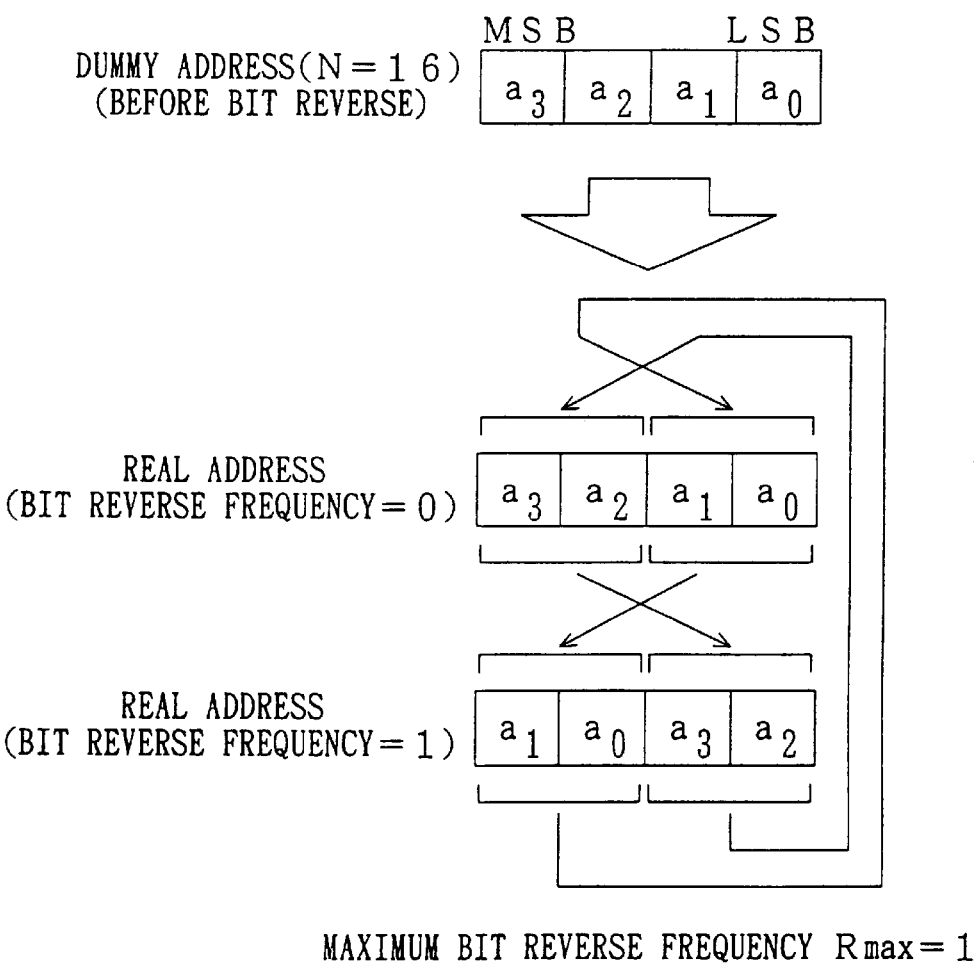
FIG. 12 is a diagram for showing variation of an address by the variable bit reverse, shown correspondingly to inter-RAM data transfer conducted by the radix-4×2 decimation in time when the number N of samples is 16.

FIG. 12 is a diagram for showing still another example of the variation of an address by the variable bit reverse, shown correspondingly to inter-RAM data transfer conducted in the radix-4×2 decimation in time on 16 samples. In FIG. 12, since the number N of samples is 16 ($=2^4$), the bit number of the address is 4. When it is assumed that the radix-4 butterfly operation is performed in both the stages 0 and 1, the 4 bits of the address are grouped successively from the LSB into a group of two bits and a group of two bits, and the groups are. reversed. Accordingly, on the basis of a dummy address a3 a2 a1 a0 before conducting the bit reverse, a real address a3 a2 a1 a0 (with the bit reverse frequency of 0) and a real address a1 a0 a3 a2 (with the bit reverse frequency of 1) can be generated through the bit reverse.

As is obvious from FIGS. 10 through 12, the original address can always be attained by repeating the bit reverse of the address. Accordingly, the number of necessary real addresses is limited, and the real addresses can be generated by, for example, incrementing the bit reverse frequency on a reference address so as to be repeatedly varied from 0 to the maximum bit reverse frequency Rmax.

Furthermore, the maximum bit reverse frequency Rmax is determined as follows: For example, in the case shown in FIG. 10, the original address can be attained by repeating the bit reverse three times, and hence the maximum bit reverse frequency Rmax is 2. Similarly, in the case shown in FIG. 11, the maximum bit reverse frequency Rmax is determined to be 4, and in the case shown in FIG. 12, the maximum bit reverse frequency Rmax is determined to be 1. In the case where the radix-4×2 decimation in time is conducted by precedently using the radix-4 butterfly operation, the relationship between the number N of samples and the maximum bit reverse frequency Rmax can be represented as follows:

When $N=4^m$ (wherein m is a positive integer), Rmax=1

When $N=4^m \cdot 2$ (wherein m is a positive integer), Rmax=$\log_2 N-1=2^m$ (2)

Now, the detailed structures and operations of the respective members of the fast Fourier transforming apparatus of this embodiment shown in FIG. 1 will be described by exemplifying the case where the number N of samples is 32.

Figure 13:
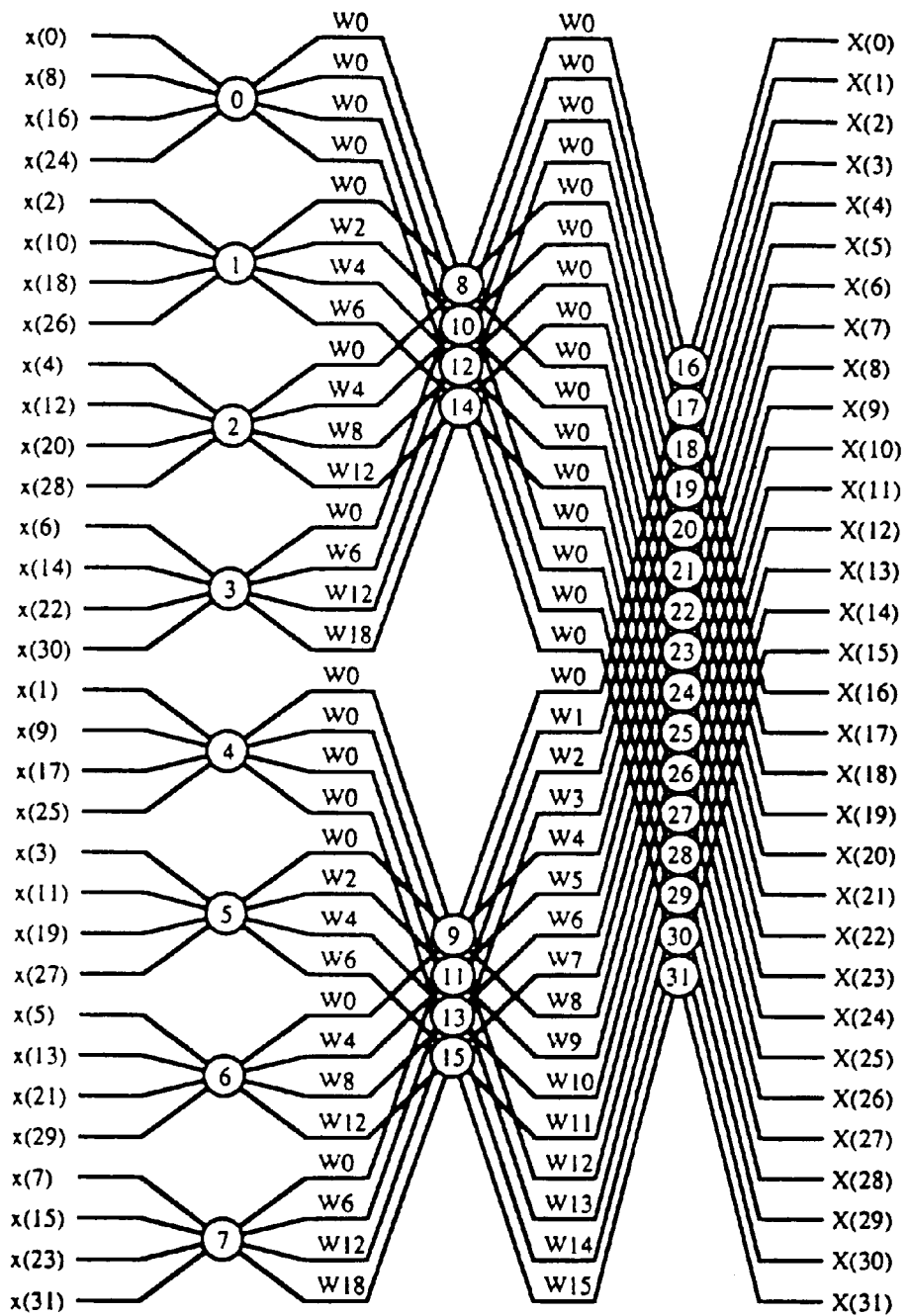
FIG. 13 is a signal flow graph obtained when the number N of samples is 32, illustrating an operation order in a butterfly operation of the first embodiment.

FIG. 13 is a signal flow graph adopted when the number N of samples is 32, for showing the processing order in the butterfly operation of this embodiment. In FIG. 13, the processing order in the butterfly operation is shown as numerals put on portions corresponding to the butterfly operation. In order to reduce change of the coefficient for the rotator calculation so as to decrease power consumption of the apparatus, the butterfly operation is performed on every 4s stages (wherein s is a stage number and is 0, 1, etc.) in the downward order in stages for the radix-4 operation, and is successively performed downward in stages for the radix-2 operation.

On the assumption that the processing is executed in the processing order of FIG. 13, the structures and operations of the respective members of the fast Fourier transforming apparatus of this embodiment will now be described.

FIGS. 14 and 15 are timing charts of signals generated by the control unit 106 for controlling the RAM address generator 105. In FIG. 14, DCN indicates an input/output timing signal for controlling the operation timing of the input/output address generation unit 111, and BCN and BST respectively indicate a butterfly operation timing signal and a butterfly operation stage signal for controlling the operation timing of the butterfly address generation unit 112. When the number of samples is N, the input/output timing signal DCN is a signal of $\log_2$ (N) bits, and has a value varying from 0 to (N−1) in one symbol period and this variation is repeated in every symbol period. Since the number N of samples is 32 in this description, the input/output timing signal DCN is a signal of 5 ($=\log_2 32$) bits. Also, when the number of stages in the butterfly operation is M, the butterfly operation stage signal BST has a value varying from 0 to (M−1) in one symbol period, and the butterfly operation timing signal BCN has a value varying from 0 to (N−1) in every period when the butterfly operation stage signal BST is constant.

Furthermore, in FIG. 15, DBR indicates an input/output bit reverse signal for controlling the first variable bit reverse unit 113, BBR indicates a butterfly operation bit reverse signal for controlling the second variable bit reverse unit 114, and RSL indicates a RAM selecting signal for controlling the selecting operation of the address selection unit 115. The butterfly operation bit reverse signal BBR is updated so as to be repeatedly changed from 0 to the maximum bit reverse frequency Rmax, and the input/output bit reverse signal DBR is updated so as to be repeatedly changed from 0 to the maximum bit reverse frequency Rmax with delayed from the butterfly operation bit reverse signal BBR by one symbol period. Also, the RAM selecting signal RSL is switched between a "H" level and a "L" level in every symbol period.

FIG. 16 is a timing chart for showing the operating timing of the butterfly operation unit 103. In a stage for the radix-4 butterfly operation, the butterfly operation unit 103 performs three rotator multiplications and one radix-4 butterfly operation, and in a stage for the radix-2 butterfly operation, the butterfly operation unit 103 performs two rotator multiplications and two radix-2 butterfly operations. In other words, the butterfly operation unit 103 performs an operation with 4 inputs and 4 outputs. Accordingly, as is shown in FIG. 16, the butterfly operation unit 103 performs the rotator multiplication and the radix-4 or radix-2 butterfly operation on input data D0 through D3 read from the first or second RAM 101 or 102 through the second data selection unit 122, so as to output data X0 through X3. The data are input/ output in each update cycle of the butterfly operation timing signal BCN generated by the control unit 106, and the output timing of the output data X0 through X3 is delayed from the input timing of the input data D0 through D3 by four cycles.

The input/output address generation unit 111 receives the input/output timing signal DCN generated by the control unit 106 and generates the input/output dummy address DAD. The input/output dummy address DAD is determined regardless of the bit reverse frequency, and the input/output address generation unit 111 directly outputs the input/output timing signal DCN of 5 bits as the input/output dummy address DAD.

The butterfly address generation unit 112 receives the butterfly operation timing signal BCN generated by the control unit 106 and generates the butterfly operation dummy address BAD. The butterfly operation dummy address BAD is determined regardless of the bit reverse frequency but on the basis of the number of stages and the radix of the butterfly operation. The butterfly address generation unit 112 generates the butterfly operation dummy address BAD in accordance with the butterfly operation stage signal BST by using a part of or all the bits of the butterfly operation timing signal BCN.

The first variable bit reverse unit 113 receives the input/output dummy address DAD generated by the input/output address generation unit 111, and generates the input/output real address RDAD by conducting the bit reverse on the input/output dummy address DAD by a bit reverse frequency specified in accordance with the input/output bit reverse signal DBR generated by the control unit 106. Similarly, the second variable bit reverse unit 114 receives the butterfly operation dummy address BAD generated by the butterfly address generation unit 112, and generates the butterfly operation real address RBAD by conducting the bit reverse on the butterfly operation dummy address BAD by a the bit reverse frequency specified in accordance with the butterfly operation bit reverse signal BBR generated by the control unit 106.

FIGS. 17(*a*) and 17(*b*) are diagrams for showing examples of the configuration of the first and second variable bit reverse units 113 and 114.

FIG. 17(*a*) shows the configuration of a selector system.

In this configuration, on the basis of an input dummy address DAD (or BAD), an address obtained without conducting the bit reverse, an address resulting from one bit reverse by a once bit reverse portion 501, an address resulting from two bit reverse by a twice bit reverse portion 502, etc., and an address resulting from Rmax times of bit reverse by a Rmax times bit reverse portion 503 are respectively generated. Among the thus generated addresses, a real address RDAD (or RBAD) is selected by a selector 504 in accordance with the bit reverse signal DBR (or BBR) to be output.

Also, FIG. 17(*b*) shows the configuration of a table system. In this configuration, addresses resulting from the bit reverse of a dummy address DAD (or BAD) are previously stored in a table (ROM) 505. A real address RDAD (RBAD) is read from the table 505 by using, as a reference address, a data obtained by linking the bit reverse signal DBR (or BBR) to an upper (or a lower) position of the input dummy address DAD (or BAD) by a bit linking circuit 506.

FIG. 18 is a diagram for showing the input/output address generating operation by the input/output address generation unit 111 and the first variable bit reverse unit 113 of this embodiment, wherein correspondence of the input/output timing signal DCN and the input/output bit reverse signal DBR to the input/output dummy address DAD and the input/output real address RDAD is shown. As is shown in FIG. 18, the input/output dummy address DAD is always equal to the input/output timing signal DCN regardless of the input/output bit reverse signal DBR. Furthermore, the input/output real address RDAD is obtained by repeating the bit reverse by a frequency equal to the value of the input/output bit reverse signal DBR after grouping the input/output dummy address DAD from the LSB into a group of 2 bits, a group of 2 bits and a group of 1 bit.

FIG. 19 is a diagram for showing the butterfly operation address generating operation by the butterfly address generation unit 112 and the second variable bit reverse unit 114 of this embodiment, wherein correspondence of the butterfly operation timing signal BCN, the butterfly operation stage signal BST and the butterfly operation bit reverse signal BBR to the butterfly operation dummy address BAD and the butterfly operation real address RBAD is shown. As is shown in FIG. 19, the butterfly operation dummy address BAD is determined in accordance with the butterfly operation stage signal BST by using the butterfly operation timing signal BCN as a reference, regardless of the butterfly operation bit reverse signal BBR. Furthermore, the butterfly operation real address RBAD is obtained by repeating the bit reverse by a frequency equal to the value of the butterfly operation bit reverse signal BBR after grouping the butterfly operation real address BAD from the LSB into a group of 2 bits, a group of 2 bits and a group of 1 bit.

The address selection unit 115 receives the input/output real address RDAD output by the first bit reverse unit 113 and the butterfly operation real address RBAD output by the second bit reverse unit 114, and selectively outputs one of them as the address for the first RAM 101 and the other as the address for the second RAM 102 in accordance with the RAM selecting signal RSL received from the control unit 106.

Figure 20:
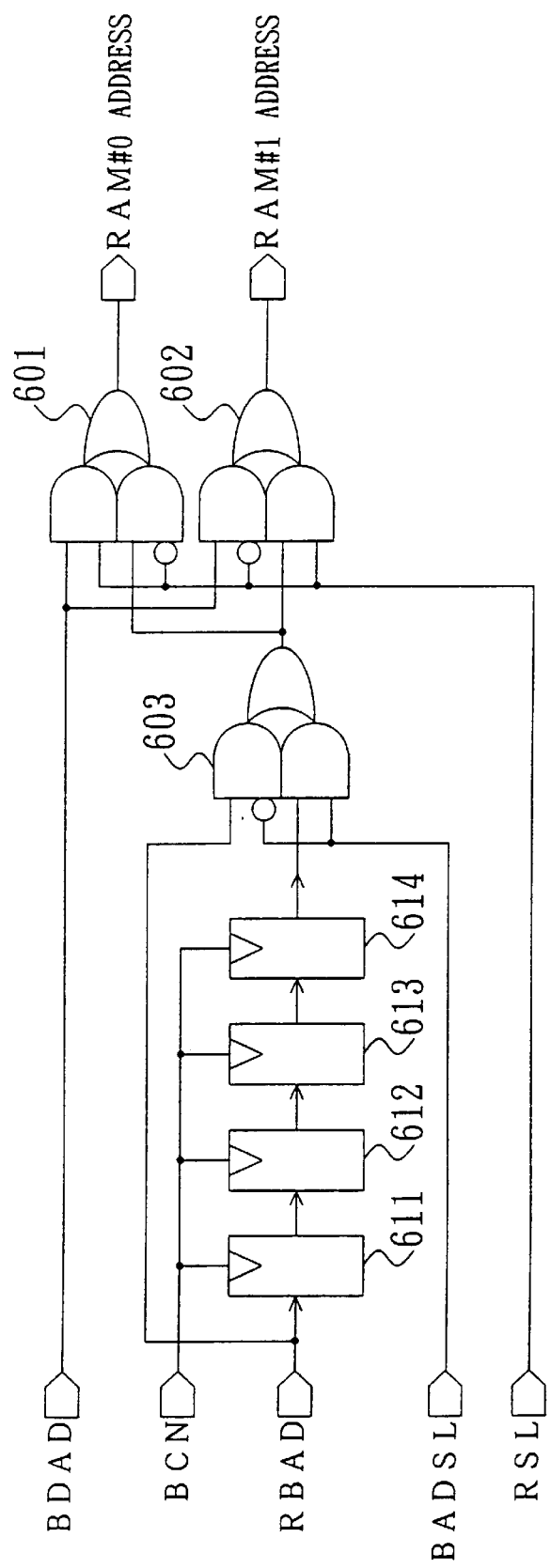
FIG. 20 is a diagram for showing the configuration of an address selection unit 115 of the fast Fourier transforming apparatus of the first embodiment.

FIG. 20 is a diagram for showing the configuration of the address selection unit 115. In FIG. 20, reference numerals 601 through 603 denote selecting circuits, and reference numeral 611 through 614 denote registers. In one of the first and second RAMs 101 and 102, which receives the input/output real address RDAD from the address selection unit 115, output data stored at the specified address RDAD is read and input data is then written at the same address. Similarly, in the other RAM receiving the butterfly operation real address RBAD from the address selection unit 115, data stored at the specified address RBAD is read as an input data for the butterfly operation unit 103 and output data of the butterfly operation unit 103 is then written at the same address.

However, since the data output of the butterfly operation unit 103 is delayed from its data input as is shown in FIG. 16, the address selection unit 115 includes, as is shown in FIG. 20, the registers 611 through 614 for holding the butterfly operation address RBAD for a predetermined period of time. The registers 611 through 614 are operated synchronously with the update cycle of the butterfly operation timing signal BCN. Therefore, by using four stages of such serially connected registers, the butterfly operation real address RBAD can be held by the address selection unit 115 during the delay of the four cycles of the data output of the butterfly operation unit 113 from the data input thereof. The selecting circuit 603 selectively outputs either a butterfly operation real address RBAD or another butterfly operation real address RBAD delayed by four cycles in accordance with a butterfly operation address selecting signal BADSL. The selecting circuits 601 and 602 selectively output one of the input/output real address RDAD and the butterfly operation real address RBAD output by the selecting circuit 603 as the address for the first RAM 101 and the other as the address for the second RAM 102 in accordance with the RAM selecting signal RSL.

Figure 21:
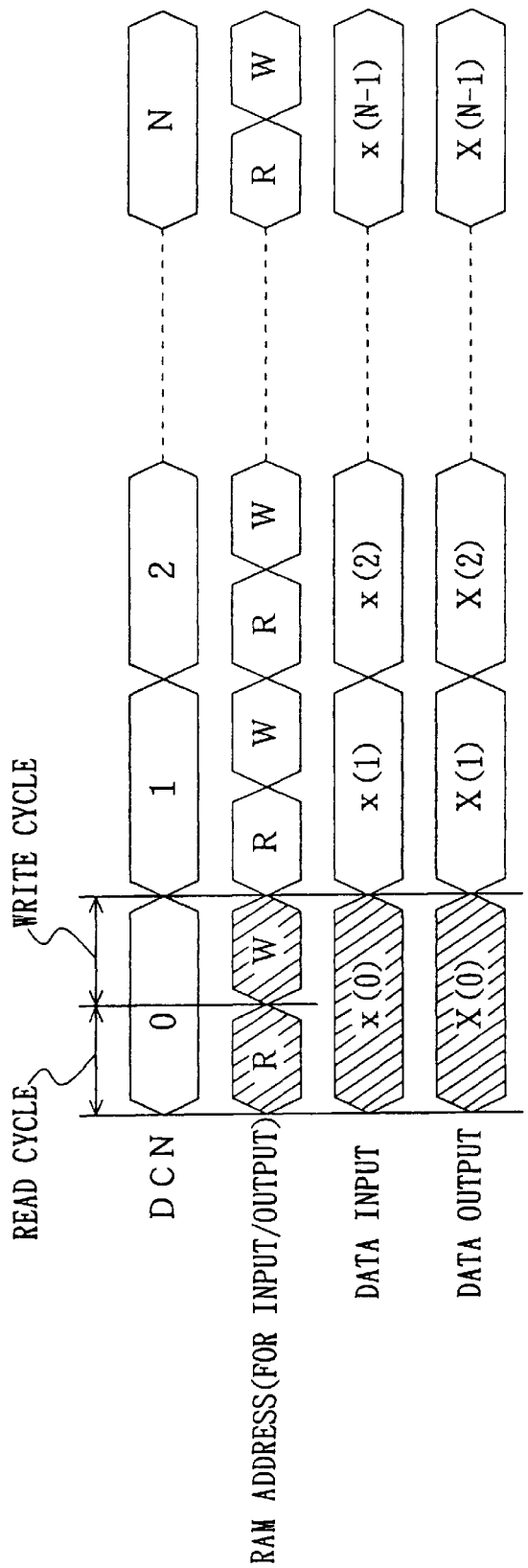
FIG. 21 is a diagram for showing a RAM access timing in data input/output in the fast Fourier transforming apparatus of the first embodiment.
Figure 22:
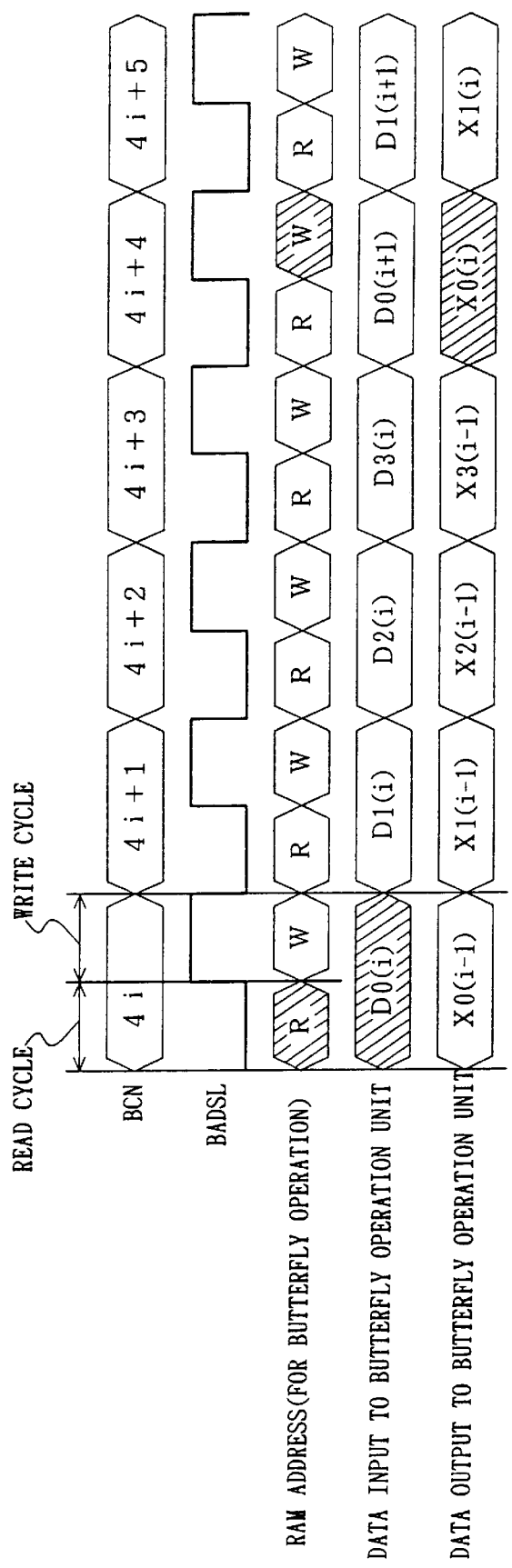
FIG. 22 is a diagram for showing a RAM access timing in the butterfly operation in the fast Fourier transforming apparatus of the first embodiment.

FIGS. 21 and 22 are timing charts for showing the RAM access timing by using the RAM address output by the address selection unit 115, namely, the RAM address generated by the RAM address generator 105. FIG. 21 shows the RAM access timing in the data input/output, and FIG. 22 shows the RAM access timing in the butterfly operation. In FIGS. 21 and 22, hatched portions correspond to a RAM access at the same address.

As is shown in FIG. 21, in the data input/output, one update cycle of the input/output timing signal DCN is halved, and the former half is used as a read cycle and the latter half is used as a write cycle of the RAM access. At this point, the data read and the data write in one update cycle of the input/output timing signal DCN are conducted at the same address.

On the other hand, in the butterfly operation, one update cycle of the butterfly operation timing signal BCN is halved as is shown in FIG. 22, and the former half is used as a read cycle and the latter half is used as a write cycle of the RAM access. At this point, data read in one update cycle of the butterfly operation timing signal BCN and data write in another update cycle delayed by four cycles are conducted at the same address.

As described so far, in this embodiment, an access address for the RAM is converted in every symbol by changing the frequency of the bit reverse conducted on a reference address in every symbol. In this manner, among output data of one symbol and input data of a following symbol, data having a common index indicating their orders in the symbols can be stored at the same address of the RAM. In other words, after reading output data of one symbol from the RAM, input data of the following symbol can be written at the same address. Thus, a space area of the RAM from which the output data has been read can be used as an input buffer for storing the input data of the following symbol. As a result, there is no need to provide an input buffer RAM. Accordingly, the fast Fourier transforming apparatus can be realized by using two RAMs by appropriately switching the two RAMs so that the first RAM can be used for the processing of even-numbered symbols in continuous plural symbols and the second RAM can be used for the processing of odd-numbered symbols.

Figure 17A:
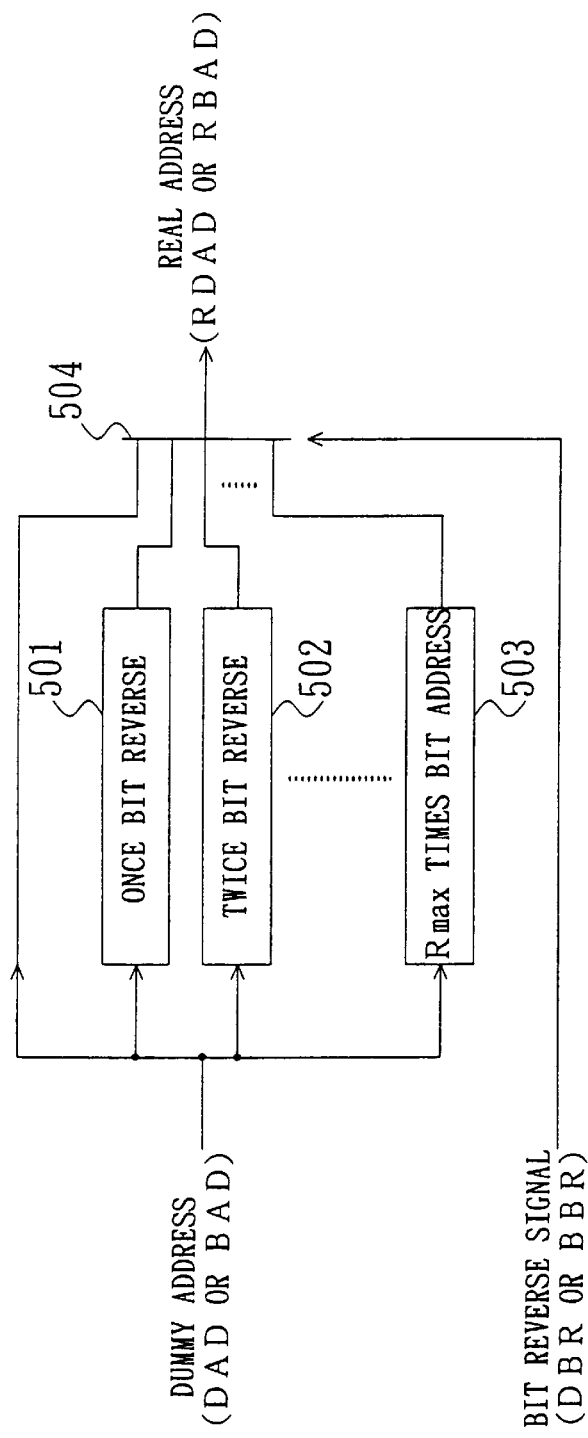
Figure 17B:
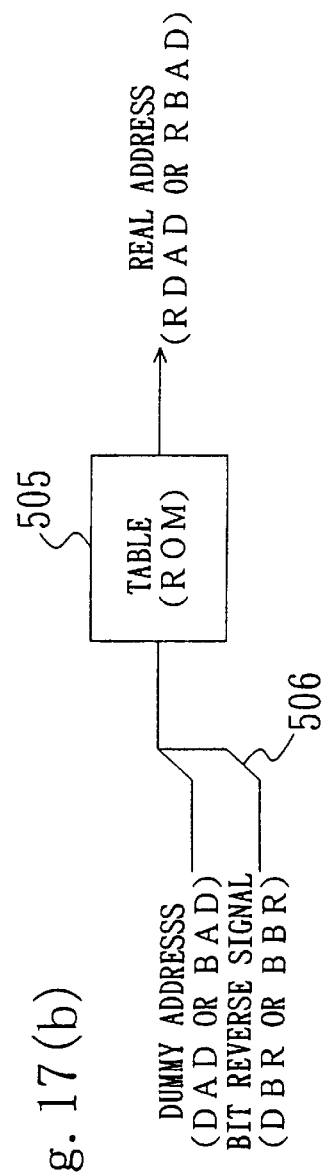

The configurations shown in FIGS. 17(a) and 17(b) are adoptable when the number of samples is fixed. When a fast Fourier transforming apparatus is used in communication equipment, the fast Fourier transforming apparatus is required of executing the fast Fourier transform on several sorts of numbers of samples in accordance with the standard of the communication. In order to apply the fast Fourier transforming apparatus of this embodiment to plural sorts of numbers of samples, it is necessary to configure the variable bit reverse units 113 and 114 so that addresses can be generated with regard to the respective sorts of numbers of samples. In other words, it is necessary to provide a variable bit reverse circuit which can execute plural types of variable bit reverse with different conversion patterns.

For example, it is possible to configure the variable bit reverse circuit which can generate addresses with regard to the respective sorts of numbers of samples by providing a variable bit reverse circuit having the configuration as is shown in FIG. 17(a) with regard to each of the sorts of numbers of samples. However, in such a case, the circuit scale is very large, resulting in disadvantageously increasing the entire circuit scale of the RAM address generator 105.

Therefore, in this embodiment, description will now be given on the configuration of a variable bit reverse circuit which can realize plural types of variable bit reverse having different conversion patterns with a small circuit scale.

Figure 23:
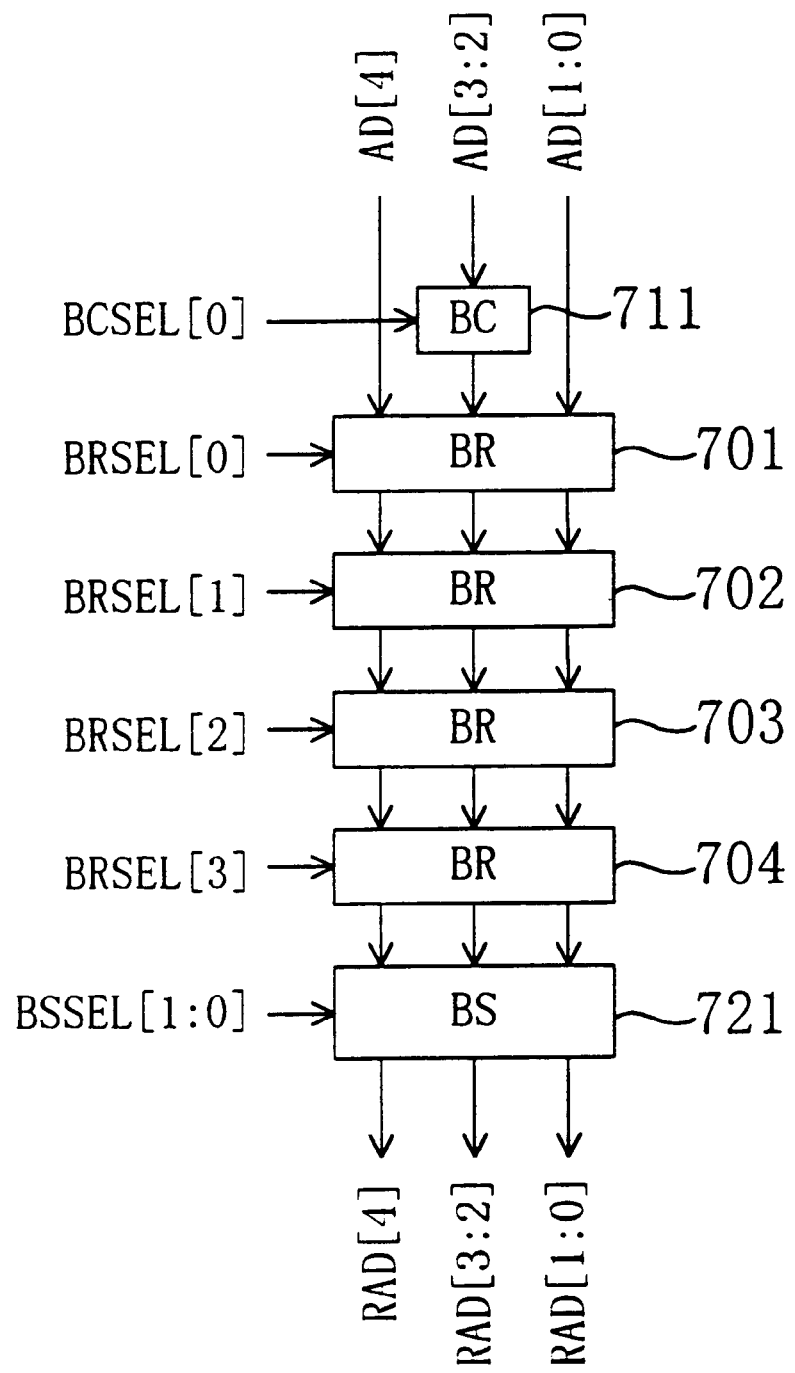
FIG. 23 is a diagram for showing another example of the configuration of the first and second variable bit reverse units 113 and 114, corresponding to a circuit diagram of a variable bit reverse circuit which can execute plural types of variable bit reverse respectively on 4, 8, 16 and 32 samples.

FIG. 23 is a diagram for showing another example of the configuration of the first and second variable bit reverse units 113 and 114, and is a circuit diagram of the variable bit reverse circuit which can realize plural types of variable bit reverse having different conversion patterns with a small circuit scale. Specifically, the variable bit reverse circuit of FIG. 23 can execute the variable bit reverse on 4, 8, 16 and 32 samples. In FIG. 23, reference numerals 701 through 704 denote bit reverse circuits (BR), a reference numeral 711 denotes bit exchanging circuit (BC) as bit exchanging means, and a reference numeral 721 denotes a barrel shifter (BS) as bit shifting means.

Figure 24A:
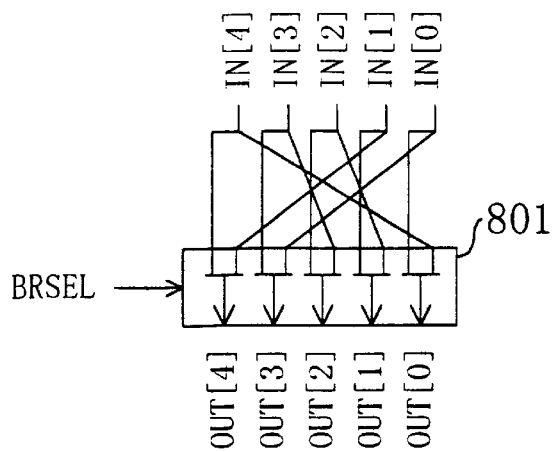
Figure 24B:
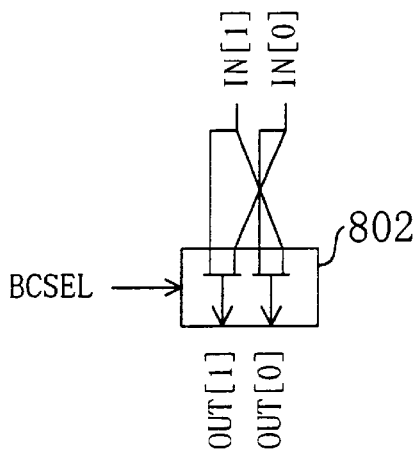
Figure 24C:
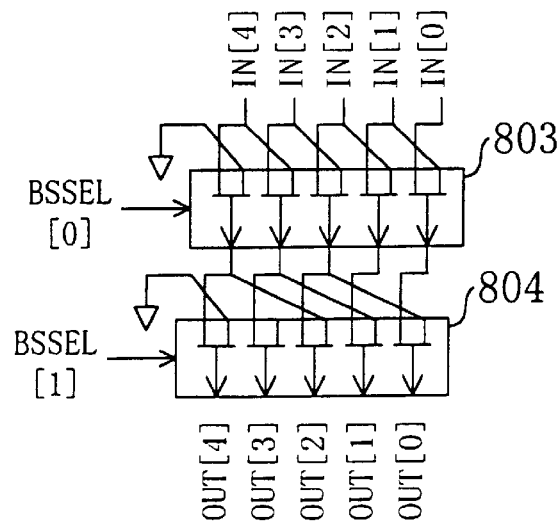

FIGS. 24(a) through 24(c) are circuit diagrams for showing the configurations of the respective circuits included in the variable bit reverse circuit of FIG. 23, wherein FIG. 24(a) shows the configuration of the bit reverse circuit BR, FIG. 24(b) shows the configuration of the bit exchanging circuit BC and FIG. 24(c) shows the configuration of the barrel shifter BS.

As is shown in FIG. 23, the bit reverse circuits 701 through 704 are controlled in accordance with respective bits of a bit reverse control signal BRSEL. As is shown in FIG. 24(a), when the corresponding bit of the bit reverse control signal BRSEL is "0", each of the bit reverse circuits 701 through 704 allows the input data to pass therethrough, and when the corresponding bit is "1", each of the bit reverse circuits conducts the bit reverse by the radix-4×2 decimation in time on 32 samples as is shown in FIG. 9. The operations are switched by a selector 801 in accordance with the bit reverse control signal BRSEL.

Furthermore, the bit exchanging circuit 711 is controlled in accordance with a bit exchange control signal BCSEL. As is shown in FIG. 24(b), when the bit exchange control signal BCSEL is "0", the bit exchanging circuit 711 allows the input data to pass therethrough, and when the bit exchange control signal BSCEL is "1", the bit exchanging circuit 711 outputs data obtained by exchanging upper and lower bits of the input data. The operations are switched by a selector 802 in accordance with the bit exchange control signal BCSEL.

Moreover, the barrel shifter 721 is controlled in accordance with a shift control signal BSSEL (of 2 bits), and includes, as is shown in FIG. 24(c), serial connection of a selector 803 controlled to be switched in accordance with the lower bit of the shift control signal BSSEL and a selector 804 controlled to be switched in accordance with the higher bit of the shift control signal BSSEL. When the lower bit of the shift control signal BSSEL is "0", the selector 803 allows the input data to pass therethrough, and when the lower bit is "1", the selector 803 shifts the input data rightward by 1 bit. When the upper bit of the shift control signal BSSEL is "0", the selector 804 allows the input data to pass therethrough, and when the higher bit is "1", the selector 804 shifts the input data rightward by 2 bits. Through such operations, when the shift control signal BSSEL is "00", data input to the barrel shifter 721 is directly output as it is, when the shift control signal BSSEL is "01", the input data is shifted rightward by 1 bit to be output, when the shift control signal BSSEL is "10", the input data is shifted rightward by 2 bits to be output, and when the shift control signal BSSEL is "11", the input data is shifted rightward by 3 bits to be output.

FIGS. 25(a) through 25(d) are diagrams for showing set values of the respective control signals for the variable bit reverse circuit of FIG. 23, wherein FIG. 25(a) shows the values set when the number N of samples is 32, FIG. 25(b) shows the values set when the number N of samples is 16, FIG. 25(c) shows the values set when the number N of samples is 8, and FIG. 25(d) shows the values set when the number N of samples is 4.

The bit reverse control signal BRSEL is changed in accordance with the bit reverse frequency, and is set at such a value that, among the bit reverse circuits 701 through 704, merely those in number corresponding to the bit reverse frequency counted from the input port can conduct the bit reverse. For example, in the case where the number N of samples is 32, when the bit reverse frequency is 1, the bit reverse control signal BRSEL is set at "0001" so that the bit reverse circuit 701 alone can conduct the bit reverse, and when the bit reverse frequency is 3, the bit reverse control signal BRSEL is set at "0111" so that the bit reverse circuits 701 through 703 alone can conduct the bit reverse.

The bit exchange control signal BSCEL is changed in accordance with the bit reverse frequency only when the number N of samples is 8, and is set at "1" only when the bit reverse circuit 701 conducts the bit reverse. Specifically, the bit exchanging circuit 711 conducts the bit exchange only when the number N of samples is 8 and the bit reverse frequency is 1 or 2. In cases apart from the case where the number N of samples is 32, the shift control signal BSSEL is set at a value except for "00" when the bit reverse frequency is odd. Also, the value of the shift control signal BSSEL is set in accordance with the number of samples. When the number N of samples is 16, the shift control signal BSSEL is set at "01" as is shown in FIG. 25(b), when the number N of samples is 8, it is set at "10" as is shown in FIG. 25(c) and when the number N of samples is 4, it is set at "11" as is shown in FIG. 25(d). In other words, when the number N of samples is 16 and the bit reverse frequency is 1, the barrel shifter 721 shifts data rightward by 1 bit, when the number N of samples is 8 and the bit reverse frequency is 1, it shifts data rightward by 2 bits, and when the number N of samples is 4 and the bit reverse frequency is 1, it shifts data rightward by 3 bits.

Now, the operation of the bit reverse circuit of FIG. 23 will be described by exemplifying the case where the number N of samples is 8. In this case, the variable bit reverse is conducted so that a real address a2 a1 a0 (with the bit reverse frequency of 0), a real address a1 ao a2 (with the bit reverse frequency of 1) and a real address a0 a2 a1 (with the bit reverse frequency of 2) can be generated from a dummy address a2 a1 a0 before conducting the bit reverse.

Figure 26A:
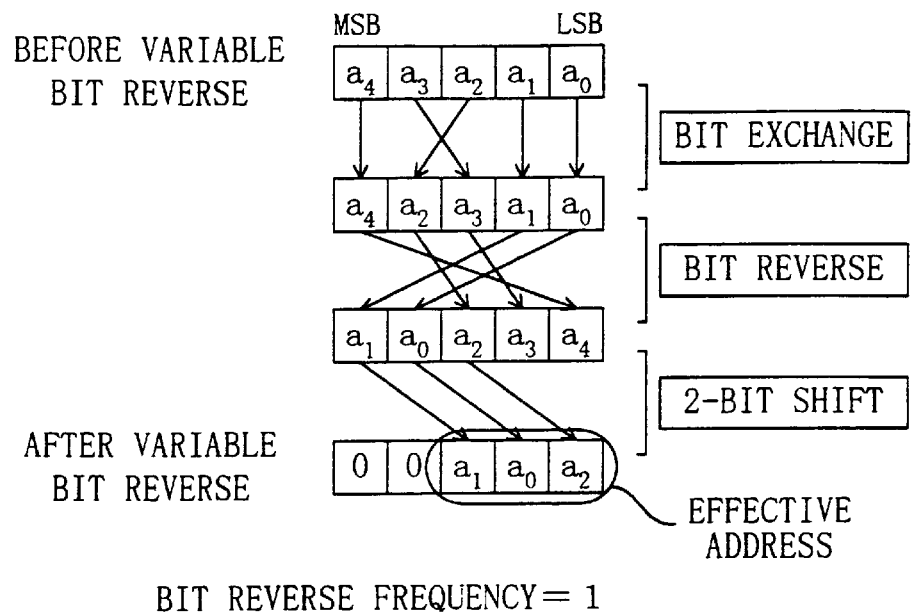
Figure 26B:
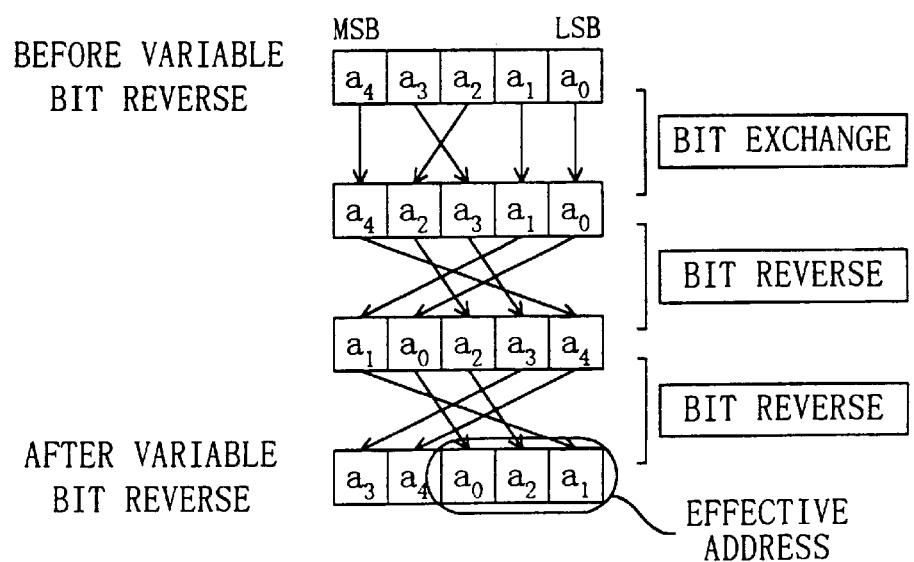

FIGS. 26(a) and 26(b) are diagrams for showing the operation of the variable bit reverse circuit of FIG. 23 when the number N of samples is 8, wherein FIG. 26(a) shows the operation with the bit reverse frequency of 1 and FIG. 26(b) shows the operation with the bit reverse frequency of 2.

When the bit reverse frequency is 1, the bit exchange, the bit reverse and two-bit shift are executed as is shown in FIG. 26(a). Specifically, since the bit exchange control signal BCSEL is "1", the bit exchange is executed by the bit exchanging circuit 711, and since the bit reverse control signal BRSEL is "0001", the bit reverse is conducted by the bit reverse circuit 701 alone, and since the bit shift control signal BSSEL is "10", the two-bit shift is executed by the barrel shifter 721. The lower 3 bits of a bit string generated through this operation are used as an effective address, resulting in generating the real address a1 a0 a2 from the dummy address a2 a1 a0.

When the bit reverse frequency is 2, the bit exchange and two bit reverse are executed as is shown in FIG. 26(b). Specifically, since the bit exchange control signal BCSEL is "1", the bit exchange is executed by the bit exchanging circuit 711, and since the bit reverse control signal BRSEL is "0011", the bit reverse is executed by the bit reverse circuits 701 and 702. On the other hand, since the bit shift control signal BSSEL is "00", the barrel shifter 721 does not execute the bit shift. The lower 3 bits of a bit string generated through this operation are used as an effective address, resulting in generating the real address a0 a2 a1 from the dummy address a2 a1 a0.

Figure 27A:
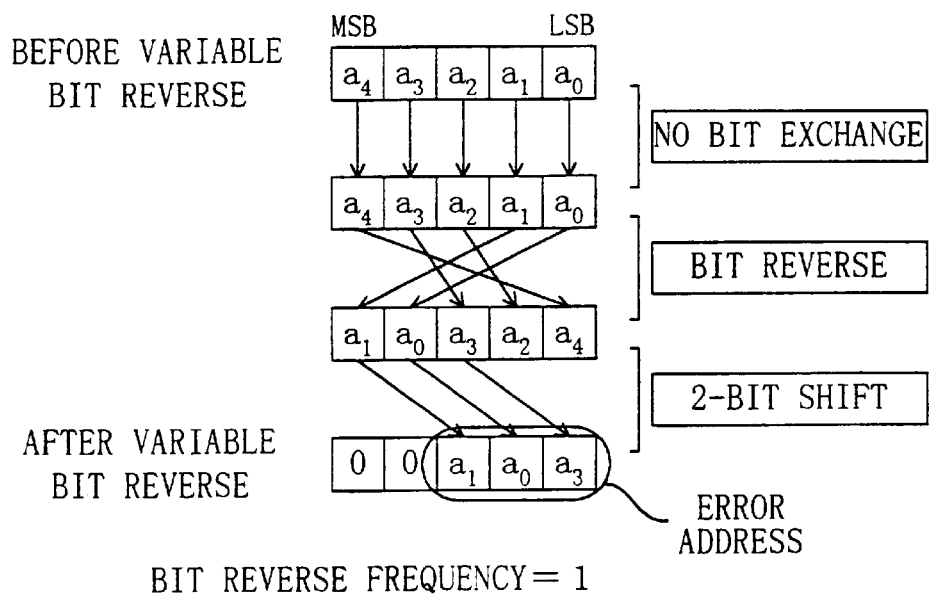
Figure 27B:
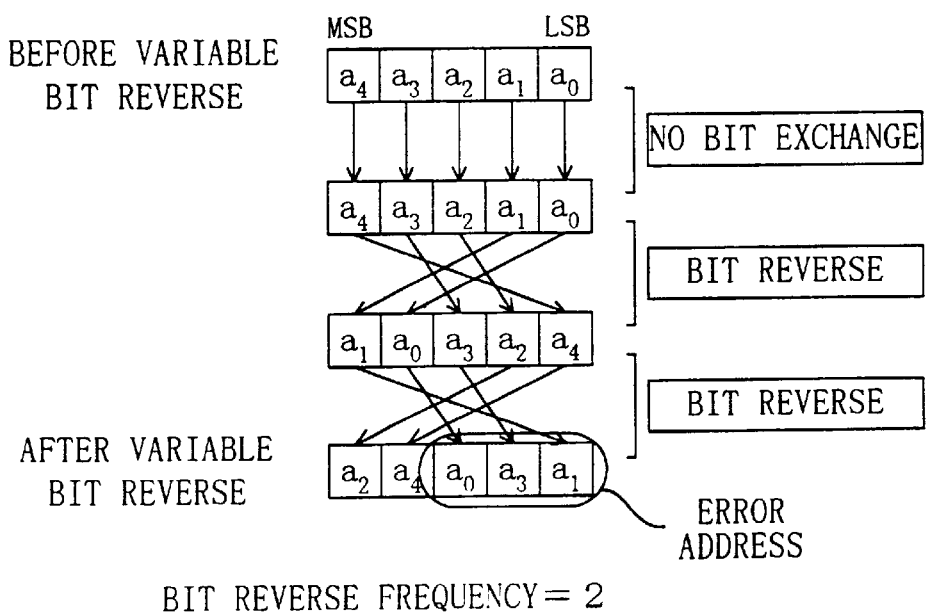

In the case where the number N of samples is 8, when the bit reverse frequency is 1 or 2, an error real address is generated without the bit exchange. FIGS. 27(a) and 27(b) show the operation without the bit exchange, which results in malfunction as follows: When the bit reverse frequency is 1, an address a1 a0 a3 is generated as the real address as is shown in FIG. 27(a), and when the bit reverse frequency is 2, an address a0 a3 a1 is generated as the real address as is shown in FIG. 27(b).

Now, generalized configuration and control of the variable bit reverse circuit of this embodiment will be described. In this description, the following variables are used:

N(i): applied number of samples
whereas $N(i)=2^i$
(wherein i is a positive integer; Mmin≦i≦Mmax)

Rmax: maximum bit reverse frequency on N(i) samples

AD[0] through AD[Mmax−1]: addresses subjected to the variable bit reverse

<Configuration>

Bit reverse circuit BR:

The bit reverse circuit BR is provided at stages in such a number that the variable bit reverse with the frequency corresponding to the number N(Mbr) of samples can be conducted.

At this point,

Mbr=Mmax (when Mmax is odd)
Mbr=Mmax+1 (when Mmax is even)

In other words, Mbr is always odd. Accordingly,

The number of stages of BR=Rmax (Mbr)=Mbr−1

Bit exchanging circuit BC:

At bit positions of AD[m] and AD[m−1] (wherein m is an odd number excluding Mbr), ((m−1)/2) bit exchanging circuits are inserted between every two stages of bit reverse circuits BR, counted from the input port.

Barrel shifter BS:

A barrel shifter with the maximum shift number of (Mmax−Mmin) is disposed subsequently to the bit reverse circuit BR at the last stage.

Figure 28:
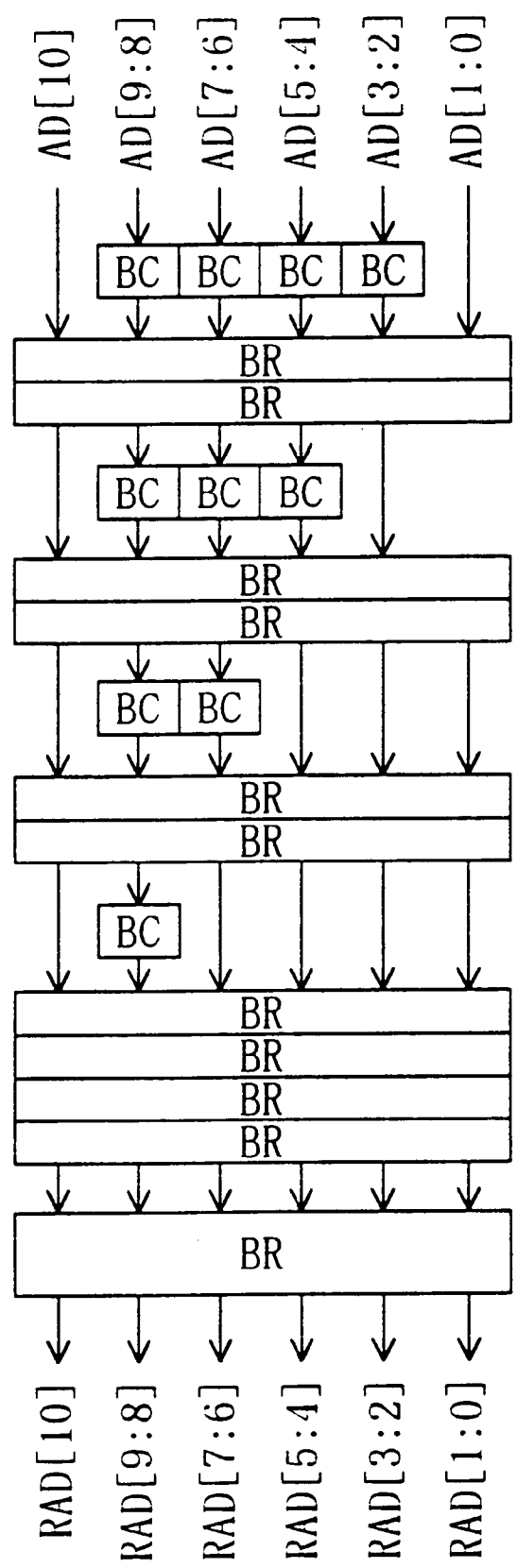
FIG. 28 is a diagram of a variable bit reverse circuit applicable to samples in number N of $2^i$ ($2 \leq N \leq 11$)

FIG. 28 is a diagram of a variable bit reverse circuit applicable to the number $N=2^i$ (2≦i≦11) of samples according to this embodiment, configured as described above.

<Control>

Bit reverse circuit BR:

Among all the bit reverse circuits BR, those in number corresponding to the bit reverse frequency, counted from the input port, are operated.

Bit exchanging circuit BC:

In the case where the number of samples is N(m) (wherein m is an odd number excluding Mbr), when the bit reverse frequency is not 0, merely the bit exchanging circuits BC disposed at bit positions AD[m] and AD[m−1] and closer to the input port than the operated bit reverse circuits BR are operated.

Barrel shifter BS:

In the case where the number of samples is N(n), when the bit reverse frequency is odd, the barrel shifter BS is operated for executing right shift by (Mmax−n) bits.

Embodiment 2

Now, a second embodiment of the invention will be described with reference to the accompanying drawings.

Figure 29:
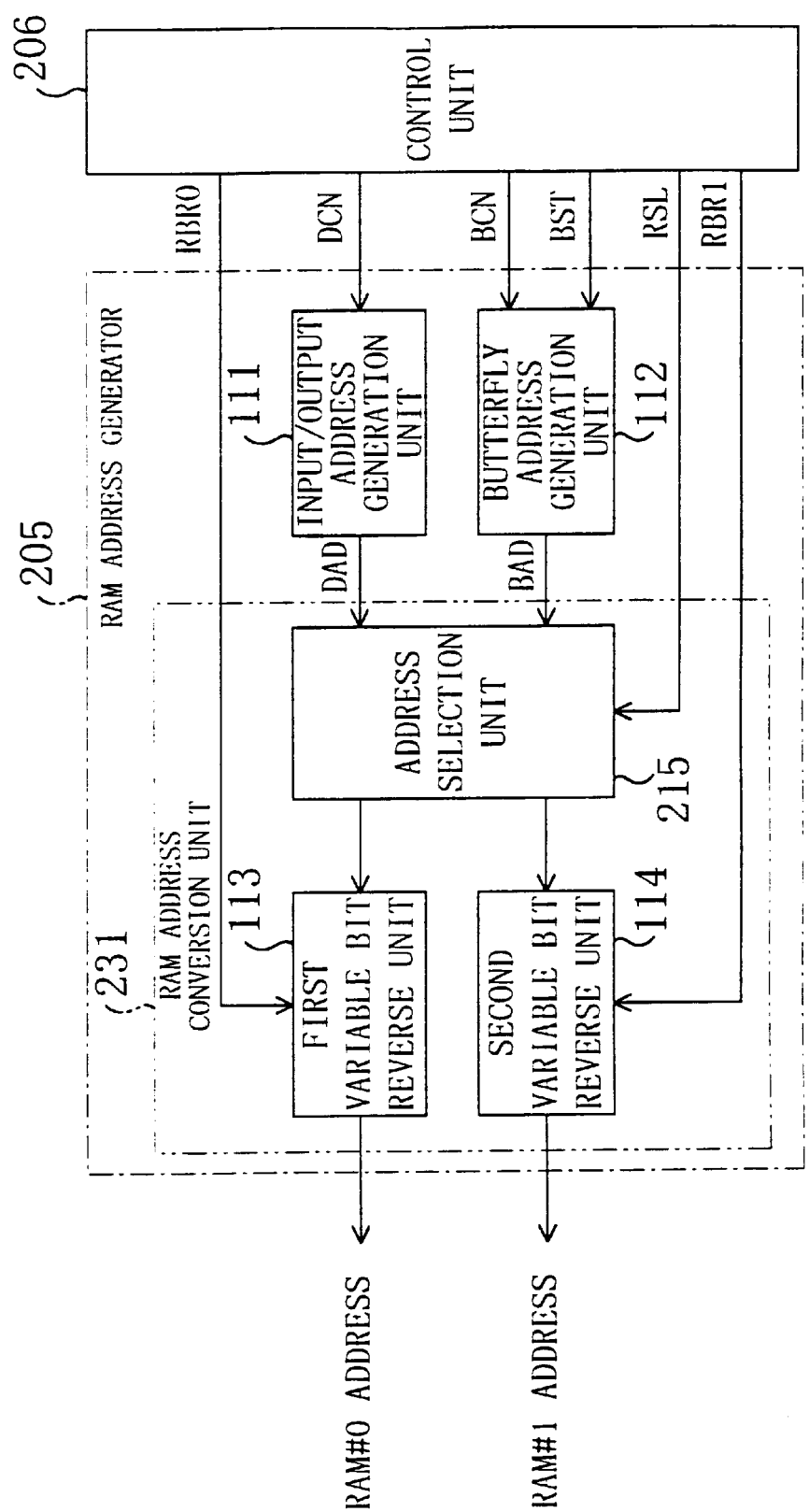
FIG. 29 is a block diagram for showing the configuration of a fast Fourier transforming apparatus according to a second embodiment the invention.

FIG. 29 is a block diagram for showing the configuration of a fast Fourier transforming apparatus of the second embodiment. Merely a RAM address generator 205 and a control unit 206 are shown in FIG. 29 because the fast Fourier transforming apparatus of this embodiment is different from the fast Fourier transforming apparatus of the first embodiment shown in FIG. 1 in the inside configuration of the RAM address generator and a part of control signals. In the fast Fourier transforming apparatus of this embodiment, the RAM address generator 105 and the control unit 106 of FIG. 1 are replaced with the RAM address generator 205 and the control unit 206 of FIG. 29. The butterfly operation unit 103, the rotator generation unit 104, the RAM address generator 205, the control unit 206 and the first and second data selection units 121 and 122 together form an FFT processor.

The RAM address generator 205 of this embodiment shown in FIG. 29 is different from the RAM address generator 105 of the first embodiment shown in FIG. 1 in an address selection unit 215 disposed at a stage preceding to the first and second variable bit reverse units 113 and 114.

The input/output address generation unit 111 receives an input/output timing signal DCN, and generates and outputs an input/output dummy address DAD. The butterfly address generation unit 112 receives a butterfly operation timing signal BCN and a butterfly operation stage signal BST, and generates and outputs a butterfly operation dummy address BAD. These operations are the same as those of the first embodiment.

The address selection unit 215 receives the input/output dummy address DAD output by the input/output address generation unit 111 and the butterfly operation dummy address BAD output by the butterfly address generation unit 112, and selectively outputs one of them as a dummy address for the first RAM 101 and the other as a dummy address for the second RAM 102 in accordance with a RAM selecting signal RSL.

The first variable bit reverse unit 113 executes the bit reverse on the dummy address for the first RAM 101 output by the address selection unit 215 by a frequency specified in accordance with a first RAM bit reverse signal RBR0 output by the control unit 206, thereby outputting a real address for the first RAM 101. The second variable bit reverse unit 114 executes the bit reverse on the dummy address for the second RAM 102 output by the address selection unit 215 by a frequency specified in accordance with a second RAM bit reverse signal RBR1 output by the control unit 206, thereby outputting a real address for the second RAM 102.

In this manner, in the fast Fourier transforming apparatus of this embodiment, the RAM addresses can be determined substantially in the same manner as in the first embodiment.

Figure 30:
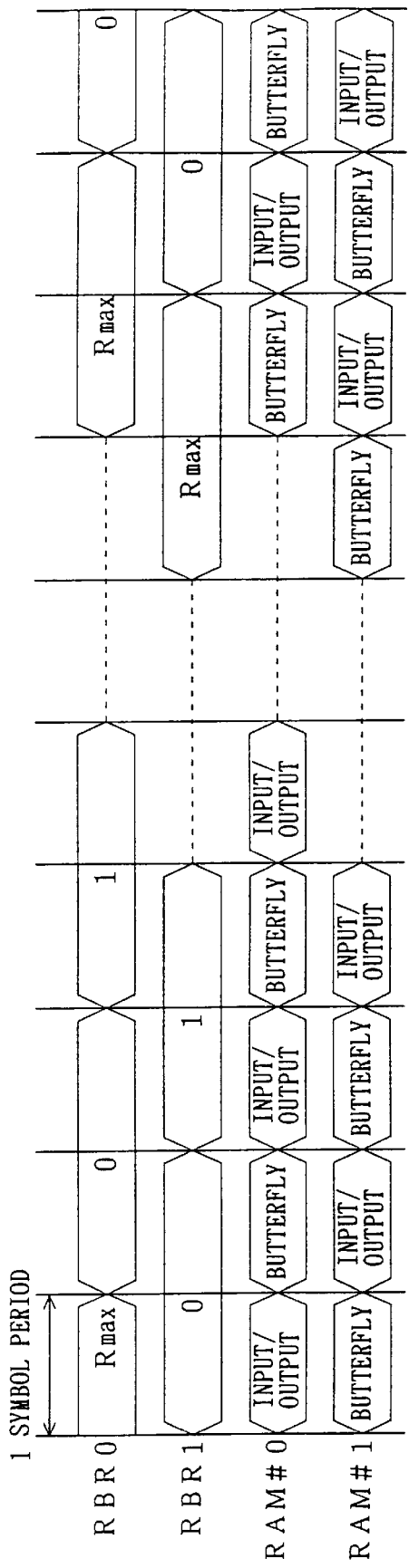
FIG. 30 is a timing chart for showing the relationship between bit reverse signals RBR0 and RBR1 for first and second RAMs and the operations of the first and second RAMs 101 and 102 (RAM#0 and RAM#1) of the fast Fourier transforming apparatus of the second embodiment.

FIG. 30 is a timing chart for showing the relationship between the first RAM bit reverse signal RBR0 and the second RAM bit reverse signal RBR1 generated by the control unit 206 and the operations of the first and second RAMs 101 and 102 (RAM#0 and RAM#1). Similarly to the first embodiment, when the maximum bit reverse frequency is indicated as Rmax, the second RAM bit reverse signal RBR1 is updated to be repeatedly changed from 0 to Rmax, and the first RAM bit reverse signal RBR0 is updated to be repeatedly changed from 0 to Rmax with one symbol period delay from the second RAM bit reverse signal RBR1. Also, the first and second RAMs 101 and 102 alternately repeat the data input/output and the butterfly operation.

In this manner, the fast Fourier transforming apparatus of this embodiment can realize the operation the same as that of the first embodiment and can attain the same effects as those of the first embodiment.

Embodiment 3

Now, a third embodiment of the invention will be described with reference to the accompanying drawings.

Figure 31:
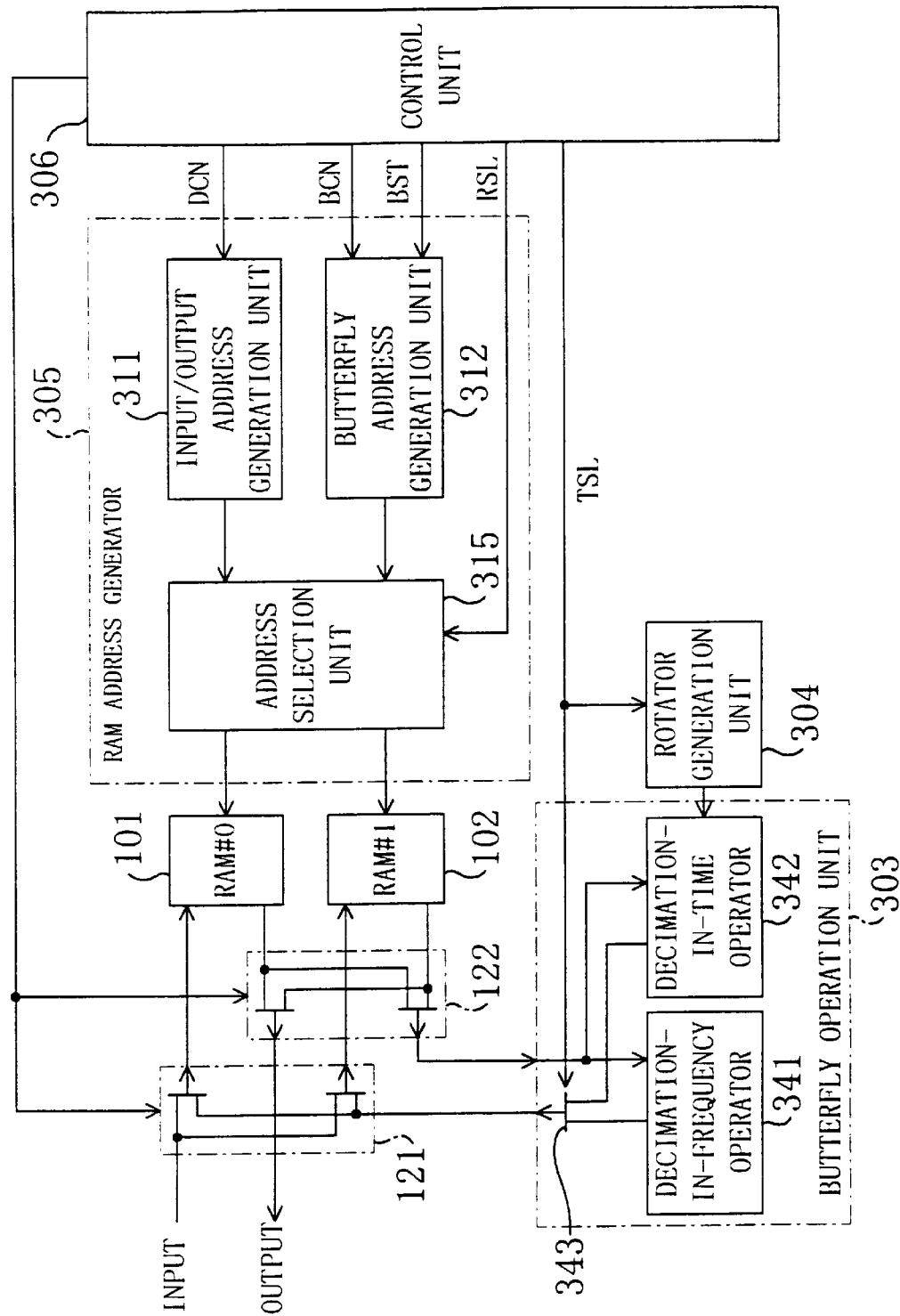
FIG. 31 is a block diagram for showing the configuration of a fast Fourier transforming apparatus according to a third embodiment of the invention.

FIG. 31 is a block diagram for showing the configuration of a fast Fourier transforming apparatus of the third embodiment. Differently from the fast Fourier transforming apparatus of the first embodiment shown in FIG. 1, a RAM address generator 305 of this embodiment does not include the variable bit reverse units but a butterfly operation unit 303 has a function to perform the butterfly operation not only by the decimation in time but also by decimation in frequency.

In this embodiment, the fast Fourier transform using the butterfly operation by the decimation in time and fast Fourier transform using the butterfly operation by the decimation in frequency are alternately executed on respective symbols. The decimation in time and the decimation in frequency are equivalent as the fast Fourier transform, but the order of input data of one and the order of output data of the other are symmetrical. In this embodiment, owing to this characteristic, the data re-arrangement is made unnecessary by alternately adopting the decimation in time and the decimation in frequency.

In FIG. 31, the butterfly operation unit 303 includes a decimation-in-frequency operator 341 for executing the butterfly operation by the decimation in frequency, a decimatin-in-time operator 342 for executing the butterfly operation by the decimation in time and a selecting circuit 343 for selectively outputting one of the results obtained by the decimation-in-frequency operator 341 and the decimation-in-time operator 342 in accordance with a thinning switching signal TSL supplied by a control unit 306. A reference numeral 304 denotes a rotator generation unit for generating a rotator used in the butterfly operation by the decimation in time or the decimation in frequency. A reference numeral 305 denotes the RAM address generator for generating addresses for controlling first and second RAMs 101 and 102. In FIG. 31, like reference numerals are used to refer to like elements used in FIG. 1, and the description is herein omitted. The butterfly operation unit 303, the rotator generation unit 304, the RAM address generator 305, the control unit 306 and first and second data selection units 121 and 122 together form an FFT processor.

In the fast Fourier transforming apparatus of this embodiment having the aforementioned configuration, similarly to the first embodiment, one of the two RAMs 101 and 102 is used for the fast Fourier transform of even-numbered symbols and the other is used for the fast Fourier transform of odd-numbered symbols.

In order to make the input of a symbol and the output of another symbol preceding by two symbols overlapped without rearranging data, a RAM address is converted in every symbol by the variable bit reverse in the first and second embodiments. In this embodiment, the butterfly operation unit 303 is controlled so that the butterfly operation can be performed alternately by the decimation in time and by the decimation in frequency on respective symbols.

Figure 32A:
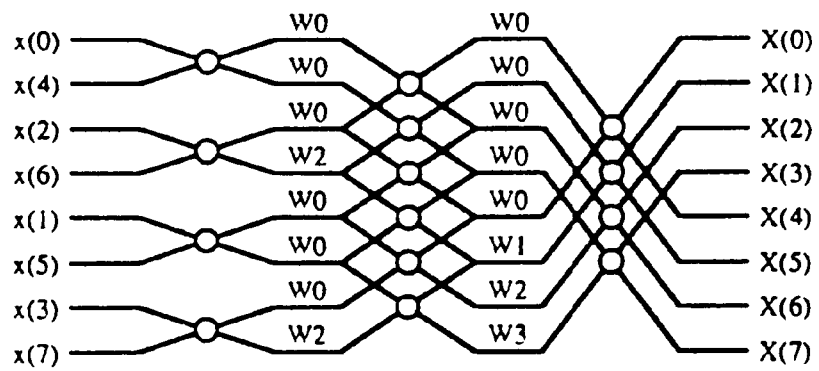
Figure 32B:
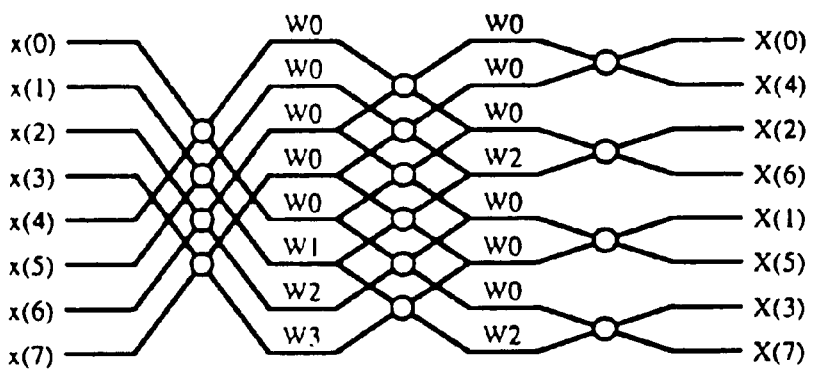

FIGS. 32(a) and 32(b) are signal flow graphs for showing radix-2 decimation in time and radix-2 decimation in frequency on 8 samples, shown as examples of the fast Fourier transform algorithm, wherein FIG. 32(a) shows the radix-2 decimation in time and FIG. 32(b) shows the radix-2 decimation in frequency. As is shown in FIG. 32(a), in the radix-2 decimation in time, when the indices of input data x(j) are arranged downward in the order of j=0, 4, 2, 6, etc., the indices of output data X(j) are arranged downward in the ascending order of j=0, 1, 2, 3, etc. On the other hand, as is shown in FIG. 32(b), in the radix-2 decimation in frequency, when the indices of input data x(j) are arranged downward in the same manner as the output data of the decimation in time of FIG. 32(a) in the ascending order of j=0, 1, 2, 3, etc., the indices of output data X(j) are arranged downward in the order of j=0, 4, 2, 6, etc., which is the same order as the input data of the decimation in time of FIG. 32(a). In other words, the orders of the input data and the output data in the decimation in frequency respectively accord with the orders of the output data and the input data in the decimation in time.

Figure 33:
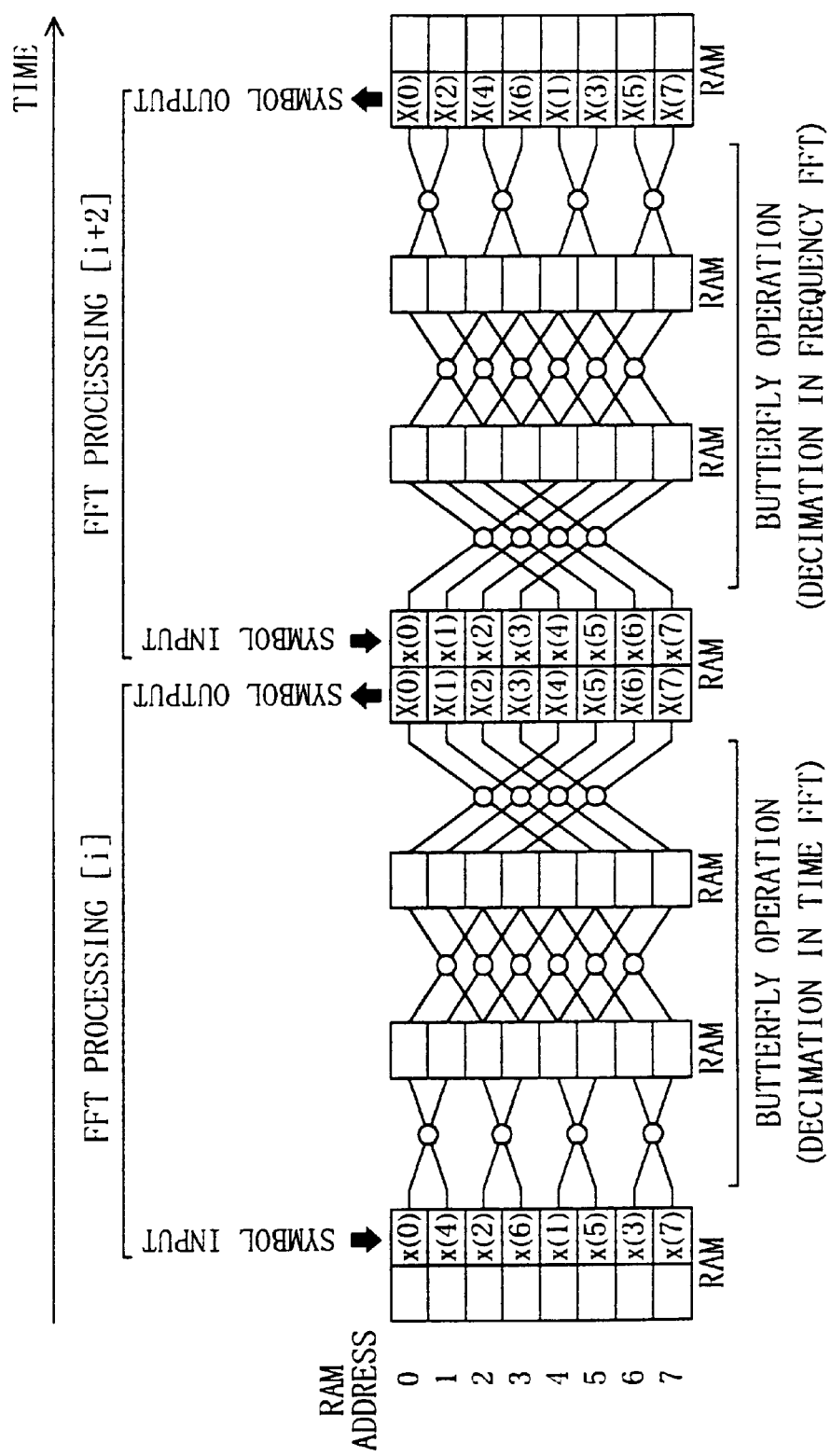
FIG. 33 is a diagram for showing an example of inter-RAM data transfer in the third embodiment, adopted when decimation in time and decimation in frequency are alternately performed on respective symbols.

FIG. 33 is a diagram for showing an example of inter-RAM data transfer in this embodiment, wherein the decimation in time and the decimation in frequency are alternately adopted on respective symbols. In the example shown in FIG. 33, the number N of samples is 8, and the data transfer of merely one of the RAMs 101 and 102 is shown.

In FIG. 33, the butterfly operation by the decimation in time is performed in an FFT processing [i] and the butterfly operation by the decimation in frequency is performed in an FFT processing [i+2]. As is shown in FIG. 33, by performing the butterfly operation alternately by the decimation in time and by the decimation in frequency, the order of the output data X(J) resulting from the butterfly operation by the decimation in time (i.e., the FFT processing [i]) accords with the order of the input data x(j) in the butterfly operation by the decimation in frequency (i.e., the FFT processing [i+2]). In addition, the order of the output data X(j) resulting from the butterfly operation by the decimation in frequency (i.e., the FFT processing [i+2]) accords with the order of the input data x(J) in the butterfly operation by the decimation in time OilS (i.e., the FFT processing [i]). Thus, the order of the output data in each FFT processing accords with the order of the input data in a following FFT processing. Accordingly, a read address of output data X(k) in each FFT processing is the same as a write address of input data x(k) in a following FFT processing. As a result, after reading the output data X(k) in one FFT processing, the input data x(k) in the following FFT processing can be stored at the same address, and thus, the input of one symbol can be overlapped with the output of another symbol preceding by two symbols.

As described above, in this embodiment, the butterfly operation by the decimation in time and the butterfly operation by the decimation in frequency are alternately performed on respective symbols, so that, among output data of one symbol and input data of a following symbol, data having a common index indicating their orders in the symbols can be stored at the same address of the RAM. In other words, after reading output data of one symbol from the RAM, input data of the following symbol can be written at the same address of the RAM. Thus, a space area of the RAM from which the output data has been read can be used as the input buffer for storing the input data of the following symbol, and hence, there is no need to provide an input buffer RAM. Accordingly, the fast Fourier transforming apparatus using two RAMs can be realized by appropriately switching the two RAMS, so that the first RAM can be used for the processing of even-numbered symbols in continuous plural symbols and the second RAM can be used for the processing of odd-numbered symbols.

Embodiment 4

A fourth embodiment of the invention will now be described with reference to the accompanying drawing.

Figure 34:
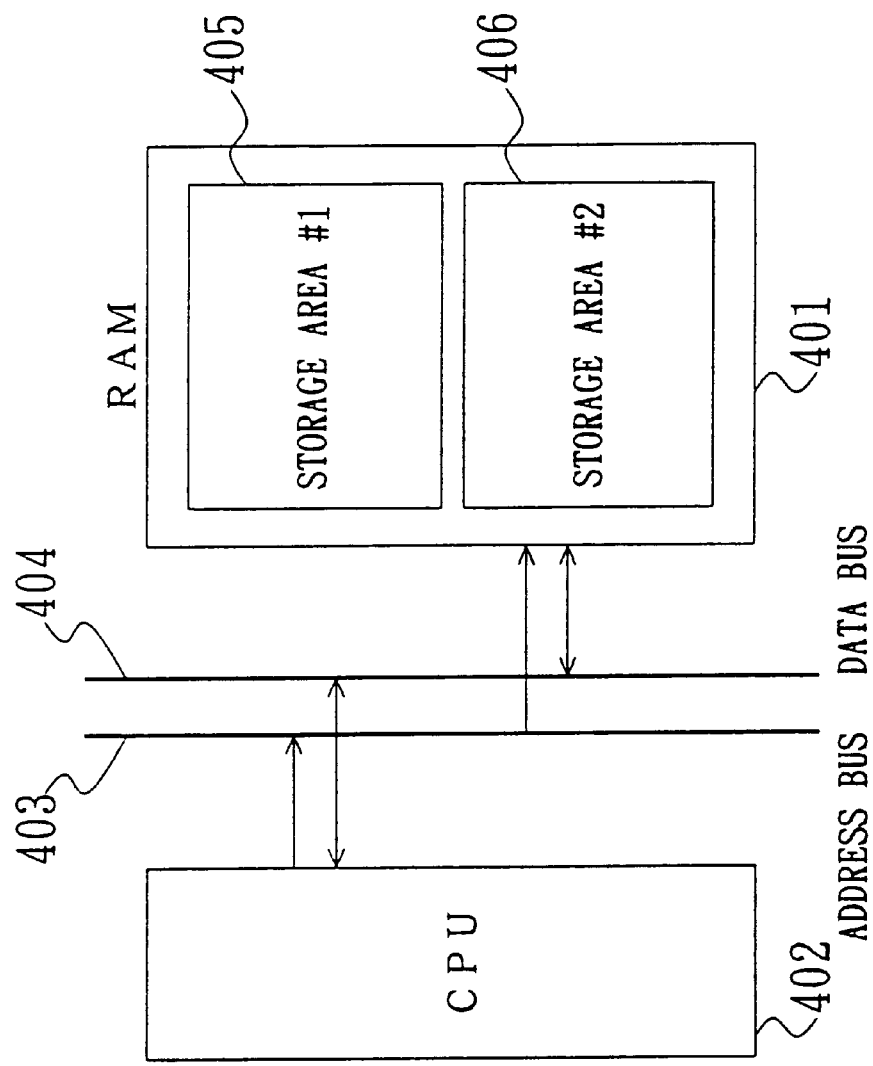
FIG. 34 is a diagram for showing the configuration of a fast Fourier transforming apparatus according to a fourth embodiment of the invention.

FIG. 34 is a diagram for showing the configuration of a fast Fourier transforming apparatus according to the fourth embodiment of the invention. In FIG. 34, a reference numeral 401 denotes a RAM for storing input/output data and intermediate data obtained in the butterfly operation, a reference numeral 402 denotes a CPU for performing the butterfly operation and calculating an address for the RAM 401, and reference numerals 403 and 404 respectively denote an address bus and a data bus for connecting the RAM 401 and the CPU 402.

In this embodiment, the storage area of the RAM 401 is divided into two storage areas 405 and 406, one of which is used for the fast Fourier transform of even-numbered symbols and the other of which is used for the fast Fourier transform of odd-numbered symbols. The CPU 402 generates addresses for storing the input/output data and the intermediate data obtained in the butterfly operation in the two storage areas 405 and 406 of the RAM 401. Also, the CPU 402 performs the butterfly operation on input data read from the RAM 401 and outputs a result of the butterfly operation to the RAM 401.

By adopting the aforementioned configuration, the operation similar to that of the fast Fourier transforming apparatus of the first embodiment can be realized. In this embodiment, the storage area of the RAM is divided into the first and second storage areas, which are respectively used for the fast Fourier transform of even-numbered symbols and odd-numbered symbols in continuous plural symbols. Thus, the memory capacity of the RAM can be decreased.

In each of the first through third embodiments, the two RAMs are provided for storing the input/output data and the intermediate data obtained in the butterfly operation, but these two RAMs can be replaced with two storage areas obtained by dividing one RAM as in this embodiment.

Also, the decimation in time is adopted as the fast Fourier transform algorithm in the first and second embodiments, but the decimation in frequency can be adopted in stead. In adopting the decimation in frequency, the operation by the butterfly operation unit is modified, and the grouping of address bits in the bit reverse by the variable bit reverse units is modified.

Furthermore, in each of the first and second embodiments, the RAM address generator includes the two variable bit reverse units, but the RAM address generator can include merely one variable bit reverse unit and the bit reverse of the input/output address and the butterfly operation address can be conducted in a time sharing manner.

Moreover, in each of the first through third embodiments, the two RAMs are provided for storing the input/output data and the intermediate data obtained in the butterfly operation, but the number of RAMs used in this invention is not limited to two but can be one, or three or more.

(Application to inverse fast Fourier transform)

The present invention is also applicable to inverse fast Fourier transform similarly to the fast Fourier transform described in the respective embodiments.

An inverse fast Fourier transform algorithm can be realized by partly changing the operation in the fast Fourier transform algorithm. For example, radix-4×2 decimation in time as an example of the inverse fast Fourier transform algorithm can be expressed by a signal flow graph similar to that of the fast Fourier transform algorithm shown in FIG. 4. However, the arithmetic expressions for operation elements are partly different from those of the fast Fourier transform algorithm.

FIG. 35 is a diagram for showing operation elements in assuming that the signal flow graph of FIG. 4 shows the inverse fast Fourier transform algorithm. In the inverse fast Fourier transform algorithm, the operations as is shown in FIG. 35 are conducted in accordance with the following arithmetic expressions, wherein difference from the arithmetic expressions for the operation elements in the fast Fourier transform shown in FIG. 5 is underlined:

<Radix-4 butterfly operation>

X0=x0+x1+x2+x3
X1=x0+j·x1−x2−j·x3
X2=x0−x1+x2−x3
X3=x0−j·x1−x2+j·x3

<Radix-2 butterfly operation>

X0=x0+x1
X1=x0−x1

<Rotator multiplication>

Y=y·W$^i$
W=e$^{j·2\pi/N}$

Accordingly, the inverse fast Fourier transform of this invention can be realized by modifying the operations by the butterfly operation unit 103 and the rotator generation unit 104 in each of the first and second embodiments, by modifying the operations by the butterfly operation unit 303 and the rotator generation unit 304 in the third embodiment, and by modifying the butterfly operation and the rotator multiplication by the CPU 402 in the fourth embodiment. In such cases, for example, in the first embodiment, the butterfly operation unit 103, the rotator generation unit 104, the RAM address generator 105, the control unit 106 and the first and second data selection units 121 and 122 together form an IFFT processor for conducting the inverse fast Fourier transform using the butterfly operation.

(Application to OFDM receiver/transmitter)

Figure 36:
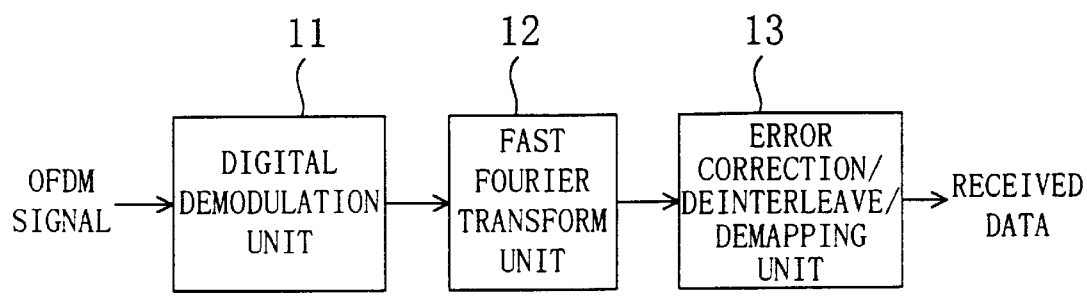
FIG. 36 is a diagram for showing the configuration of an OFDM receiver using the fast Fourier transforming apparatus of the invention.

The fast Fourier transform apparatus of this invention can be used, for example, in an OFDM receiver. FIG. 36 is a block diagram for showing the configuration of the OFDM receiver including the fast Fourier transforming apparatus of this invention, in which the fast Fourier transforming apparatus of this invention is used as a fast Fourier transform unit 12. A digital demodulation unit 11 converts an input OFDM signal into a base band signal through digital demodulation, and the fast Fourier transform unit 12 performs the fast Fourier transform on the base band signal output by the digital demodulation unit 11. An OFDM signal is a modulation signal using a large number of mutually orthogonal carriers, and complex data of respective carriers are decoded through the fast Fourier transform. In other words, the output of the fast Fourier transform unit 12 corresponds to decoded complex data of the carriers. An error correction/deinterleave/demapping unit 13 performs a predetermined error correction/deinterleave/demapping processing on the output of the fast Fourier transform unit 12, thereby decoding the received data. By using the fast Fourier transforming apparatus of this invention as the fast Fourier transform unit 12, a memory capacity required of the fast Fourier transform unit 12 can be decreased, resulting in decreasing a cost of the entire OFDM receiver.

Figure 37:
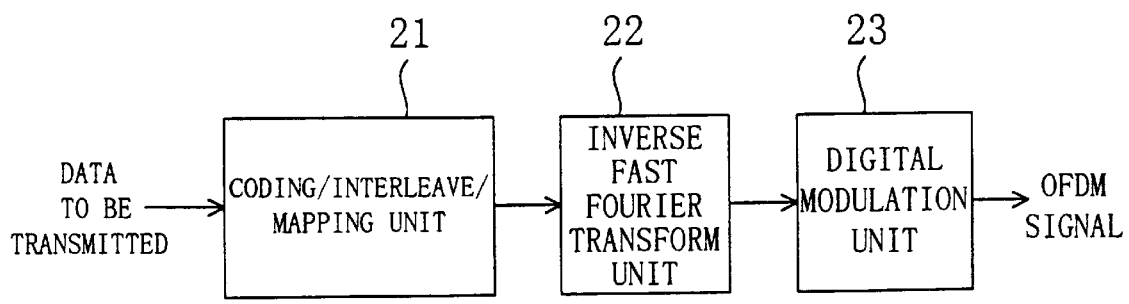
FIG. 37 is a diagram for showing the configuration of an OFDM transmitter using an inverse fast Fourier transforming apparatus of the invention.

Similarly, the inverse fast Fourier transforming apparatus of this invention can be used in, for example, an OFDM transmitter. FIG. 37 is a block diagram for showing the OFDM transmitter including the inverse fast Fourier transforming apparatus of this invention, in which the inverse fast Fourier transforming apparatus of this invention is used as an inverse fast Fourier transform unit 22. In the OFDM transmitter of FIG. 37, a reverse processing to that in the OFDM receiver of FIG. 36 is executed for generating an OFDM signal. Specifically, a coding/interleave/mapping unit 21 conducts a predetermined error correction coding/interleave/mapping processing on data to be transmitted, thereby generating complex data of respective carriers. The inverse fast Fourier transform unit 22 performs the inverse fast Fourier transform on the complex data of the respective carriers, and a digital modulation unit 23 modulates the frequency of the output of the inverse fast Fourier transform unit 22. Thus, the OFDM signal is generated. By using the inverse fast Fourier transforming apparatus of this invention as the inverse fast Fourier transform unit 22, a memory capacity required of the inverse fast Fourier transform unit 22 can be decreased, resulting in decreasing a cost of the entire OFDM transmitter.

What is claimed is:

1. A variable bit reverse circuit for conducting bit reverse for a butterfly operation by a specified frequency, comprising:

serially connected plural bit reverse circuits, each of said plural bit reverse circuits being programmable between a first state and a second state, said plural bit reverse circuit conducting a one bit reverse in said first state, said plural bit reverse circuits allowing data to pass therethrough without bit reverse in said second state, wherein, among said plural bit reverse circuits, bit reverse circuits in number corresponding to said specified frequency conduct the bit reverse and remaining bit reverse circuits allow data to pass therethrough.

2. The variable bit reverse circuit of claim 1, wherein said variable bit reverse circuit conducts the bit reverse on plural sorts of numbers of samples, and said variable bit reverse circuit is further provided with bit shifting means for conducting bit shift of data resulting from the bit reverse by said plural bit reverse circuits, so that positions of effective bits accord with each other in input data and output data.

3. The variable bit reverse circuit of claim 2, further comprising bit exchanging means for conducting bit exchange disposed precedently to any of said plural bit reverse circuits.

* * * * *